US012747953B2

(12) United States Patent
Takiguchi et al.

(10) Patent No.: US 12,747,953 B2
(45) Date of Patent: Sep. 29, 2026

(54) INFORMATION PROCESSING DEVICE AND INFORMATION PROCESSING METHOD

(71) Applicant: TOYOTA JIDOSHA KABUSHIKI KAISHA, Toyota (JP)

(72) Inventors: Yuka Takiguchi, Tokyo (JP); Yuko Mineta, Chofu (JP); Masaaki Tomiya, Urayasu (JP); Misa Okamoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 110 days.

(21) Appl. No.: 18/989,544

(22) Filed: Dec. 20, 2024

(65) Prior Publication Data

US 2025/0237512 A1 Jul. 24, 2025

(30) Foreign Application Priority Data

Jan. 24, 2024 (JP) ................................ 2024-008808

(51) Int. Cl.
*G01C 21/34* (2006.01)

(52) U.S. Cl.
CPC ..... *G01C 21/3415* (2013.01); *G01C 21/3461* (2013.01)

(58) Field of Classification Search
CPC ........................ G01C 21/3415; G01C 21/3461
See application file for complete search history.

(56) References Cited

U.S. PATENT DOCUMENTS 8,725,409 B2 * 5/2014 Chen .................. G01C 21/3461 340/995.13
11,269,333 B2 * 3/2022 Kuwahara .............. G01C 21/20
2020/0096354 A1 * 3/2020 Duquene ............ G01C 21/3415

FOREIGN PATENT DOCUMENTS

JP 2005-354489 A 12/2005
JP 2007-078587 A 3/2007
JP 2018-040574 A 3/2018
JP 2021-135100 A 9/2021

* cited by examiner

*Primary Examiner* — Luke Huynh
(74) *Attorney, Agent, or Firm* — Dinsmore & Shohl LLP

(57) ABSTRACT

In an information processing device, a control unit acquires a scheduled distribution end time of a content to be distributed to a passenger of a vehicle, determines a first route expected to allow the vehicle to arrive at a destination within a predetermined period including the scheduled distribution end time, acquires a passage time at which the vehicle has actually passed a predetermined location located midway of the first route, determines according to the passage time whether it is necessary to make a route change midway of the first route, determines a second route expected to advance or delay the time of arrival at the destination compared to the first route in response to it being determined that it is necessary to make a route change midway of the first route, and outputs information that prompts a route change to the second route midway of the first route.

17 Claims, 12 Drawing Sheets

FIG. 8

OPERATION DATA

D401

| VEHICLE ID | DEPARTURE LOCATION | DESTINATION | SCHEDULED DISTRIBUTION START TIME | SCHEDULED DISTRIBUTION END TIME | FIRST ROUTE | PREDETER-MINED LOCATION | SCHEDULED PASSAGE TIME | TIME SHORTENING ROUTE | TIME EXTENSION ROUTE |
|---|---|---|---|---|---|---|---|---|---|
| V0001 | —— | —— | —— | —— | —— | —— | —— | —— | —— |
| ⋮ | ⋮ | ⋮ | ⋮ | ⋮ | ⋮ | ⋮ | ⋮ | ⋮ | ⋮ |

INFORMATION PROCESSING DEVICE AND INFORMATION PROCESSING METHOD

CROSS-REFERENCE TO RELATED APPLICATION

This application claims priority to Japanese Patent Application No. 2024-008808 filed on Jan. 24, 2024, incorporated herein by reference in its entirety.

BACKGROUND

1. Technical Field

The present disclosure relates to an information processing device and an information processing method.

2. Description of Related Art

There is known a system that distributes a content to a passenger of a vehicle, in which the distribution of the content is terminated midway, or a part of the content is thinned out, when the vehicle is to arrive at the vicinity of a drop-off position before the content ends (see Japanese Unexamined Patent Application Publication No. 2005-354489 (JP 2005-354489 A), for example).

SUMMARY

The present disclosure can provide a service that distributes a content to a passenger of a vehicle and that can increase the satisfaction of the passenger. A first aspect of the present disclosure provides an information processing device that executes information processing about a route to be moved by a vehicle from a first location to a second location. The information processing device includes a control unit configured to:

acquire a scheduled available end time of a content for a passenger of the vehicle while the vehicle moves from the first location to the second location; determine a first route expected to allow the vehicle to arrive at the second location within a predetermined period including the scheduled available end time; acquire a passage time at which the vehicle has actually passed a third location located midway of the first route; determine according to the passage time whether it is necessary to make a route change midway of the first route; determine a second route expected to advance or delay a time of arrival at the second location compared to the first route in response to it being determined that it is necessary to make the route change midway of the first route; and output information that causes the route change to the second route midway of the first route.

A second aspect of the present disclosure provides an information processing device that executes information processing about a route to be traveled by a vehicle from a departure location to a destination. The information processing device includes a control unit configured to: acquire a scheduled distribution end time of a content to be distributed to a passenger of the vehicle during travel; determine a first route expected to allow the vehicle to arrive at the destination within a predetermined period including the scheduled distribution end time; acquire a passage time at which the vehicle has actually passed a predetermined location located midway of the first route; determine according to the passage time whether it is necessary to make a route change midway of the first route; determine a second route expected to advance or delay a time of arrival at the destination compared to the first route in response to it being determined that it is necessary to make the route change midway of the first route; and output information that prompts the route change to the second route midway of the first route.

In the information processing device according to the above aspect, the determining of the first route may include: extracting a plurality of route candidates for a route that is travelable by the vehicle from the departure location to the destination and that is expected to allow the vehicle to arrive at the destination within the predetermined period; and determining, as the first route, a route candidate that enables a route change to a time shortening route to be made midway of the route candidate and that enables a route change to a time extension route to be made midway of the route candidate, among the route candidates, the time shortening route being expected to advance the time of arrival at the destination and the time extension route being expected to delay the time of arrival at the destination.

In the information processing device according to the above aspect, the extracting of the route candidates may include excluding a route that passes through an area in which a communication quality is less than a predetermined quality from a plurality of routes. The routes may each be a route that is travelable by the vehicle from the departure location to the destination and that is expected to allow the vehicle to arrive at the destination within the predetermined period.

In the information processing device according to the above aspect, in response to the determining of the first route, the control unit may set, as the predetermined location, a location located midway of the first route and on a closer side with respect to a branch location for the time shortening route and a branch location for the time extension route.

In the information processing device according to the above aspect, the determining as to whether it is necessary to make the route change midway of the first route may include: determining that it is necessary to make the route change midway of the first route when a time difference between a scheduled passage time for the predetermined location and the passage time is greater than a predetermined time length; and determining that it is not necessary to make the route change midway of the first route when the time difference between the scheduled passage time for the predetermined location and the passage time is not greater than the predetermined time length.

In the information processing device according to the above aspect, the determining that it is necessary to make the route change midway of the first route may include:

determining that it is necessary to make a route change to the time shortening route midway of the first route when the passage time is later than the scheduled passage time for the predetermined location; and determining that it is necessary to make a route change to the time extension route midway of the first route when the passage time is earlier than the scheduled passage time for the predetermined location.

In the information processing device according to the above aspect, the determining of the second route may include: determining a route that leads to the destination by passing through the time shortening route from a middle of the first route as the second route when the passage time is later than the scheduled passage time for the predetermined location; and determining a route that leads to the destination by passing through the time extension route from a middle of the first route as the second route when the passage time is earlier than the scheduled passage time for the predetermined location.

In the information processing device according to the above aspect, the control unit may change the scheduled passage time for the predetermined location when the scheduled distribution end time of the content has been changed.

A third aspect of the present disclosure provides an information processing method for a route to be traveled by a vehicle from a departure location to a destination. In the information processing method, a computer is configured to: acquire a scheduled distribution end time of a content to be distributed to a passenger of the vehicle during travel; determine a first route expected to allow the vehicle to arrive at the destination within a predetermined period including the scheduled distribution end time; acquire a passage time at which the vehicle has actually passed a predetermined location located midway of the first route; determine according to the passage time whether it is necessary to make a route change midway of the first route; determine a second route expected to advance or delay a time of arrival at the destination compared to the first route in response to it being determined that it is necessary to make the route change midway of the first route; and output information that prompts the route change to the second route midway of the first route.

In the information processing method according to the above aspect, the determining of the first route may include: extracting a plurality of route candidates for a route that is travelable by the vehicle from the departure location to the destination and that is expected to allow the vehicle to arrive at the destination within the predetermined period; and determining, as the first route, a route candidate that enables a route change to a time shortening route to be made midway of the route candidate and that enables a route change to a time extension route to be made midway of the route candidate, among the route candidates, the time shortening route being expected to advance the time of arrival at the destination and the time extension route being expected to delay the time of arrival at the destination.

In the information processing method according to the above aspect, the extracting of the route candidates may include excluding a route that passes through an area in which a communication quality is less than a predetermined quality from a plurality of routes that is travelable by the vehicle from the departure location to the destination and that is expected to allow the vehicle to arrive at the destination within the predetermined period.

In the information processing method according to the above aspect, in response to the determining of the first route, the computer may set, as the predetermined location, a location located midway of the first route and on a closer side with respect to a branch location for the time shortening route and a branch location for the time extension route.

In the information processing method according to the above aspect, the determining as to whether it is necessary to make the route change midway of the first route may include: determining that it is necessary to make the route change midway of the first route when a time difference between a scheduled passage time for the predetermined location and the passage time is greater than a predetermined time length; and determining that it is not necessary to make the route change midway of the first route when the time difference between the scheduled passage time for the predetermined location and the passage time is not greater than the predetermined time length.

In the information processing method according to the above aspect, the determining that it is necessary to make the route change midway of the first route may include:

determining that it is necessary to make a route change to the time shortening route midway of the first route when the passage time is later than the scheduled passage time for the predetermined location; and determining that it is necessary to make a route change to the time extension route midway of the first route when the passage time is earlier than the scheduled passage time for the predetermined location.

In the information processing method according to the above aspect, the determining of the second route may include: determining a route that leads to the destination by passing through the time shortening route from a middle of the first route as the second route when the passage time is later than the scheduled passage time for the predetermined location; and determining a route that leads to the destination by passing through the time extension route from a middle of the first route as the second route when the passage time is earlier than the scheduled passage time for the predetermined location.

In the information processing method according to the above aspect, the computer may change the scheduled passage time for the predetermined location when the scheduled distribution end time of the content has been changed.

The present disclosure can also be regarded as an information processing program that causes a computer to execute the information processing method, or a non-transitory storage medium that stores the information processing program.

According to the present disclosure, it is possible to provide a service that distributes a content to a passenger of a vehicle and that can increase the satisfaction of the passenger.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 schematically illustrates an example of operation data according to the embodiment;

DETAILED DESCRIPTION OF EMBODIMENTS

Figure 1:
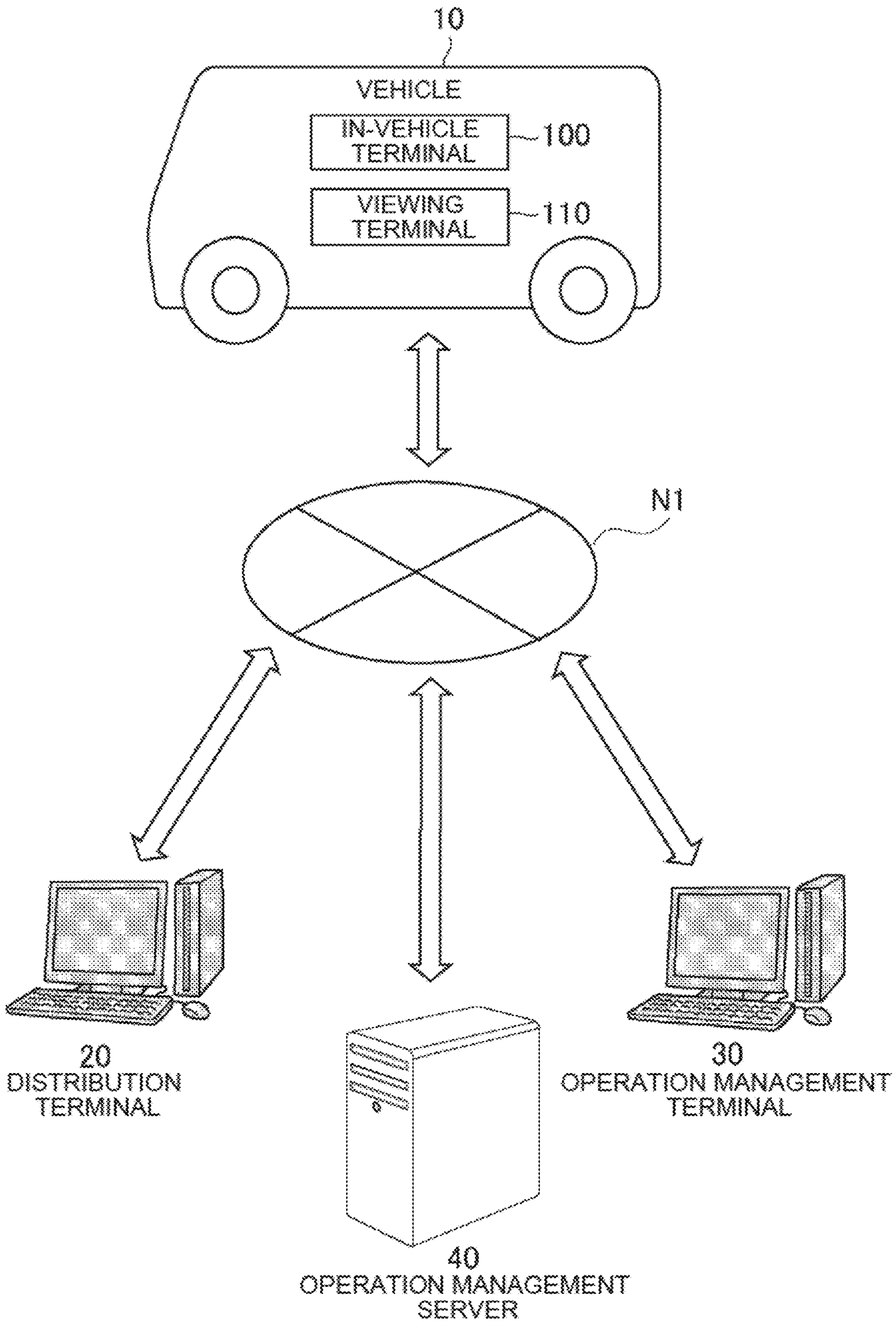
FIG. 1 illustrates an overview of a system according to an embodiment.

There has been studied a service that distributes a content associated with an event that is to be or has been held in an event site, etc., to a vehicle that transports visitors between a station of public transportation, etc., and the event site. In such a service, the vehicle may arrive at the destination before the content ends, or there may be a long time after the content ends before the vehicle arrives at the destination, if the vehicle arrives at the destination earlier or later than a scheduled time. As a result, the satisfaction of the passengers with the service may be low. Thus, it is necessary to take measures to reduce the deviation between the distribution end time of the content and the time of arrival at the destination.

Thus, the information processing device according to the present disclosure has made it possible to flexibly change a route according to the progress of the travel of the vehicle traveling from the departure location to the destination. The information processing device according to the present disclosure is a computer that manages a route to be traveled by the vehicle from the departure location to the destination. Such an information processing device may be a terminal that is used by an operation manager for the vehicle, a terminal that is used by a driver of the vehicle, a terminal that is used by a distributor of the content, a server, etc.

In the information processing device according to the present disclosure, a control unit acquires a scheduled distribution end time of a content to be distributed to a passenger of a vehicle during travel. The content may be any of video, still images, audio, etc. The content may be recorded in advance, or may be distributed live. Such a content may be distributed to a viewing device mounted on the vehicle, or may be distributed to a passenger terminal.

The control unit of the information processing device according to the present disclosure determines a first route expected to allow the vehicle to arrive at a destination within a predetermined period including the acquired scheduled distribution end time. By way of example, the determining of the first route may include: extracting a plurality of route candidates for a route that is travelable by the vehicle from the departure location to the destination and that is expected to allow the vehicle to arrive at the destination within the predetermined period; and determining, as the first route, a route candidate that enables a route change to a time shortening route to be made midway of the route candidate and that enables a route change to a time extension route to be made midway of the route candidate, among the route candidates, the time shortening route being expected to advance the time of arrival at the destination and the time extension route being expected to delay the time of arrival at the destination.

By way of example, the extracting of the route candidates may include excluding a route that passes through an area in which a communication quality is less than a predetermined quality from a plurality of routes that is travelable by the vehicle from the departure location to the destination and that is expected to allow the vehicle to arrive at the destination within the predetermined period. The predetermined quality may be a communication quality required to distribute the content, by way of example. That is, the predetermined quality may be a communication quality determined such that the distribution of the content is hindered when the communication quality falls below the predetermined quality.

The control unit of the information processing device according to the present disclosure acquires a passage time at which the vehicle has actually passed a predetermined location located midway of the first route while the vehicle is traveling along the first route. Here, the passage time may be acquired by the control unit collating position information on the vehicle and position information on the predetermined location, by way of example. In another example, the passage time may be transmitted from the vehicle to the information processing device when the vehicle passes the predetermined location. The predetermined location is a location on the closer side with respect to (closer to the departure location than) a branch location for the time shortening route and a branch location for the time extension route, among locations included in the first route. Such a predetermined location may be set by the control unit in response to the determination of the first route.

The control unit of the information processing device according to the present disclosure determines whether it is necessary to make a route change midway of the first route, according to the passage time at which the vehicle has passed the predetermined location. By way of example, the determining of the necessity of a route change may include: determining that it is necessary to make a route change when a time difference between a scheduled passage time for the predetermined location and the passage time is greater than a predetermined time length; and determining that it is not necessary to make a route change when the time difference between the scheduled passage time for the predetermined location and the passage time is not greater than the predetermined time length. Here, the scheduled passage time may be a time at which the vehicle is expected to pass the predetermined location on the assumption that the vehicle arrives at the destination within a predetermined period including the scheduled distribution end time. Such a scheduled passage time may be determined according to the length of the first route, the legal speed limit of the first route, the number of traffic signals along the first route, etc., by way of example.

Here, when the time difference between the scheduled passage time for the predetermined location and the passage time is greater than a predetermined time length, the control unit may determine that it is necessary to make a route change to the time shortening route if the passage time is later than the scheduled passage time for the predetermined location. When the time difference between the scheduled passage time for the predetermined location and the passage time is greater than a predetermined time length, meanwhile, the control unit may determine that it is necessary to make a route change to the time extension route if the passage time is earlier than the scheduled passage time for the predetermined location.

The control unit of the information processing device according to the present disclosure determines a second route expected to advance or delay the time of arrival at the destination compared to the first route in response to it being determined that it is necessary to make a route change midway of the first route. In that event, the control unit may determine a route that leads to the destination by passing through the time shortening route from a middle of the first route as the second route when the passage time is later than the scheduled passage time for the predetermined location. Meanwhile, the control unit may determine a route that leads to the destination by passing through the time extension route from a middle of the first route as the second route when the passage time is earlier than the scheduled passage time for the predetermined location.

In response to the determination of the second route, the control unit of the information processing device according to the present disclosure outputs information that prompts a route change to the second route midway of the first route. Here, when the information processing device according to the present disclosure is a terminal that is used by the operation manager for the vehicle, the outputting of information that prompts a route change may include transmitting such information to a terminal that is used by the driver of the vehicle. When the information processing device according to the present disclosure is a terminal that is used by the driver of the vehicle, the outputting of information that prompts a route change may include outputting such information to an output device of the terminal that is used by the driver. When the information processing device according to the present disclosure is a terminal that is used by the distributor of the content, the outputting of information that prompts a route change may include transmitting such information to a terminal that is used by the driver of the vehicle. When the information processing device according to the present disclosure is a server, the outputting of information that prompts a route change may include transmitting such information to a terminal that is used by the driver of the vehicle.

With the information processing device according to the present disclosure, the deviation between the distribution end time of the content and the time at which the vehicle arrives at the destination can be reduced as much as possible by changing the travel route for the vehicle from the first route to the second route, even when the amount of traffic on the first route is more or less than expected, etc. Thus, it is possible to increase the satisfaction of a passenger of a vehicle with a service that distributes a content to the passenger.

When the content is distributed live, the scheduled distribution end time of the content may be changed while the content is being distributed. Thus, the control unit of the information processing device according to the present disclosure may change the scheduled passage time for the predetermined location when the scheduled distribution end time of the content has been changed. Here, the control unit may change the scheduled passage time to a time that is earlier than the original time when the scheduled distribution end time of the content is advanced from the original time. Meanwhile, the control unit may change the scheduled passage time to a time that is later than the original time when the scheduled distribution end time of the content is delayed from the original time. This makes it possible to suppress the deviation between the distribution end time of the content and the time at which the vehicle arrives at the destination, even when the scheduled distribution end time of the content is changed.

Embodiment

An embodiment of the present disclosure will be described below with reference to the drawings. The configuration of the following embodiment is illustrative, and the present embodiment described below is merely an example of the present disclosure in all respects. Various improvements or modifications may be made without departing from the scope of the present disclosure. In the implementation of the present disclosure, specific configurations that match the embodiment may be employed as appropriate. Data that appear in the present embodiment are described using a natural language. More specifically, however, the data are specified using a pseudo language, commands, parameters, a machine language, etc. that can be recognized by a computer.

Overview of System

In the present embodiment, an example will be described in which an information processing device according to the present disclosure is applied to a system that provides a service of distributing a content to passengers of a vehicle that transports visitors to an event site. Examples of the event site include facilities where sports and other competitions are held, facilities where music concerts are held, facilities where exhibitions are held, etc. In the present embodiment, a stadium where sports events are held is taken as an example of the event site.

FIG. 1 schematically illustrates an example of the configuration of a system according to the present embodiment. In the example illustrated in FIG. 1, the system is configured to include a vehicle 10, an in-vehicle terminal 100, a viewing terminal 110, a distribution terminal 20, an operation management terminal 30, and an operation management server 40. While one vehicle 10, one in-vehicle terminal 100, one viewing terminal 110, and one distribution terminal 20 are illustrated in the example illustrated in FIG. 1, there may be a plurality of vehicles 10, in-vehicle terminals 100, viewing terminals 110, and distribution terminals 20. The in-vehicle terminal 100, the viewing terminal 110, the distribution terminal 20, the operation management server 40, and the operation management terminal 30 are connected to each other via a network N1. The network N1 may include a wide area network (WAN) that is a global public communication network such as the Internet, and/or a wireless communication network such as Wi-Fi (registered trademark), by way of example.

The vehicle 10 is a vehicle that transports visitors between a predetermined pick-up/drop-off location and the stadium. The predetermined pick-up/drop-off location may be a station of public transportation, by way of example. The in-vehicle terminal 100 is a computer that is used by a driver (or a crew) of the vehicle 10. The viewing terminal 110 is a computer installed in a passenger cabin of the vehicle 10. The distribution terminal 20 is a computer that is used by a distributor of a content. The operation management terminal 30 is a computer that is used by an operation manager for the vehicle 10. The operation management server 40 is a computer that performs information processing related to the operation of the vehicle 10.

In the system according to the present embodiment, a content is distributed from the distribution terminal 20 to the viewing terminal 110 via the network N1 when the vehicle 10 is traveling between the station of public transportation and the stadium. The content according to the present embodiment is a content associated with sports of which an event is held in the stadium. Here, when the vehicle 10 is traveling while carrying visitors from the station to the stadium (visitors that will watch the sports event to be held in the stadium), the content may be a video that introduces the sports event to be held in the stadium, a video of an interview with a player that will participate in the sports event to be held in the stadium, etc., for example. When the vehicle 10 is traveling while carrying visitors from the stadium to the station (visitors that watched the sports event held in the stadium), the content may be a highlight video of the sports event held in the stadium, a video of a post-match interview with a player that participated in the sports event held in the stadium, etc., for example.

In distributing such a content, the distribution terminal 20 and the viewing terminal 110 may be connected through a web conferencing system so that a dialogue such as questions and answers can be held between a distributor (such as a master of ceremony (MC) and/or a player, for example) and the visitors on board the vehicle 10.

In the system according to the present embodiment, the distribution terminal 20 transmits distribution information to the operation management terminal 30 through the network N1 before the vehicle 10 starts travel. The distribution information according to the present embodiment is information that includes identification information (vehicle identifier (ID)) on the vehicle 10 as the destination of distribution of the content, the departure location (the station of public transportation or the stadium) of the vehicle 10 as the destination of distribution of the content, the destination (the stadium or the station of public transportation) of the vehicle 10 as the destination of distribution of the content, the scheduled distribution start time of the content to be distributed, and the scheduled distribution end time of the content to be distributed. The operation management terminal 30 transmits the distribution information to the operation management server 40 in response to receiving such distribution information. The distribution information may be orally communicated from the distributor to an operator of the operation management terminal 30 so that the operator inputs the distribution information to the operation management terminal 30. In that case, the operation management terminal 30 may transmit the distribution information to the operation management server 40 in response to input of the distribution information.

The operation management server 40 determines a first route for the vehicle 10 as the destination of distribution in response to receiving the distribution information transmitted from the operation management terminal 30. The first route according to the present embodiment is a route to be traveled by the vehicle 10 from the departure location to the destination included in the distribution information. In the present embodiment, the first route is a route that is expected to allow the vehicle 10, starting at the departure location at substantially the same time as the scheduled distribution start time, to arrive at the destination within a predetermined period (e.g., within 10 minutes before and after the scheduled distribution end time), and that enables a route change to a time shortening route and a time extension route to be made midway of the route. The time shortening route is a route expected to advance the time of arrival at the destination when the vehicle 10 makes a route change to the time shortening route midway of the first route, compared to when the vehicle 10 keeps traveling on the first route. The time extension route is a route expected to delay the time of arrival at the destination when the vehicle 10 makes a route change to the time extension route midway of the first route, compared to when the vehicle 10 keeps traveling on the first route. The method of determining the first route will be discussed later.

The operation management server 40 transmits information about the determined first route (hereinafter occasionally referred to as "first route information") to the in-vehicle terminal 100 and the operation management terminal 30. The first route information includes the departure location of the vehicle 10, the destination of the vehicle 10, the scheduled distribution start time of the content, the scheduled distribution end time of the content, and information that indicates the first route. Upon receiving the first route information, the in-vehicle terminal 100 starts providing route guidance according to the first route in response to the arrival of the scheduled distribution start time of the content. Further, the in-vehicle terminal 100 transmits the present position of the vehicle 10 to the operation management server 40 and the operation management terminal 30 in predetermined cycles (e.g., every several tens of milliseconds to several hundreds of milliseconds) when the vehicle 10 is traveling from the departure location to the destination. Meanwhile, upon receiving the first route information, the operation management terminal 30 outputs a map screen on which the first route is displayed. Further, the operation management terminal 30 displays the present position of the vehicle 10 transmitted from the in-vehicle terminal 100 on the map screen described above.

The operation management server 40 acquires a passage time at which the vehicle 10 has actually passed a predetermined location based on the present position transmitted from the in-vehicle terminal 100. The predetermined location is a location located midway of the first route and on the closer side with respect to (closer to the departure location than) a branch location for the time shortening route and a branch location for the time extension route. Such a predetermined location is determined by the operation management server 40 when the first route is determined. The operation management server 40 determines whether it is necessary for the vehicle 10 to make a route change by comparing the acquired passage time and a scheduled passage time. The scheduled passage time is such a time that the vehicle 10 is expected to arrive at the destination within the predetermined period if the time difference between the passage time for the predetermined location and the scheduled passage time is equal to or less than a predetermined time length (e.g., about several minutes).

When the time difference between the passage time for the predetermined location and the scheduled passage time is greater than the predetermined time length, the operation management server 40 determines that it is necessary for the vehicle 10 to make a route change. In that case, the operation management server 40 determines a second route expected to advance or delay the time of arrival at the destination compared to the first route. Here, if the passage time for the predetermined location is later than the scheduled passage time, the operation management server 40 determines a route that leads to the destination by passing through the time shortening route from the middle of the first route as the second route. If the passage time for the predetermined location is earlier than the scheduled passage time, meanwhile, the operation management server 40 determines a route that leads to the destination by passing through the time extension route from the middle of the first route as the second route.

In response to the determination of the second route, the operation management server 40 transmits second route information to the in-vehicle terminal 100. The second route information is information that prompts a route change from the first route to the second route, and may include information that indicates the second route, the scheduled arrival time at the destination when the vehicle keeps traveling along the first route, the scheduled arrival time at the destination when a route change is made to the second route, etc., by way of example. Upon receiving such second route information, the in-vehicle terminal 100 presents information that prompts a route change to the second route to the driver of the vehicle 10. In that event, the in-vehicle terminal 100 may present information that prompts making a choice as to whether to make a route change to the second route to the driver of the vehicle 10. When the driver of the vehicle 10 selects to make a route change to the second route, the in-vehicle terminal 100 may provide route guidance according to the second route. When a route change is made from the first route to the second route in this manner, information (hereinafter occasionally referred to as "route change information") indicating that a route change has been made from the first route to the second route may be transmitted from the in-vehicle terminal 100 to the operation management terminal 30. Upon receiving the route change information, the operation management terminal 30 outputs a map screen on which the second route and the present position of the vehicle 10 are displayed.

With the system according to the present embodiment, the deviation between the distribution end time of the content and the time at which the vehicle 10 arrives at the destination can be reduced as much as possible. As a result, it is possible to increase the satisfaction of the passengers of the vehicle 10 with a service that distributes a content to the passengers.

Hardware Configuration of System

Here, an example of the hardware configuration of the in-vehicle terminal 100, the viewing terminal 110, the distribution terminal 20, the operation management terminal 30, and the operation management server 40 included in the system according to the present embodiment will be described.

In-Vehicle Terminal

Figure 2:
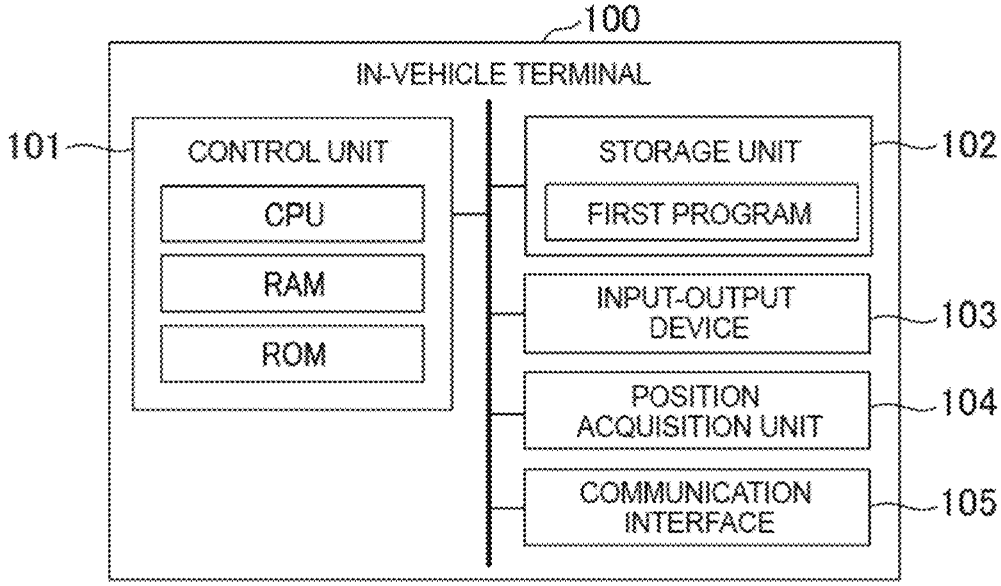
FIG. 2 schematically illustrates an example of the hardware configuration of an in-vehicle terminal included in the system according to the embodiment.

FIG. 2 schematically illustrates an example of the hardware configuration of the in-vehicle terminal 100 according to the present embodiment. The in-vehicle terminal 100 is a computer that is used by the driver of the vehicle 10, and includes a control unit 101, a storage unit 102, an input-output device 103, a position acquisition unit 104, and a communication interface 105. Such an in-vehicle terminal 100 may be implemented by a combination of a car navigation system and a data communication module (DCM) mounted on the vehicle 10, by way of example. The in-vehicle terminal 100 may be implemented by a portable computer (such as a smartphone or a tablet terminal, for example) that is used by the driver.

The in-vehicle terminal 100 can be constituted as a computer that includes a processor (such as a central processing unit (CPU) or a digital signal processor (DSP)), a main storage device (such as a random access memory (RAM) and a read only memory (ROM)), and an auxiliary storage device (such as an erasable programmable read only memory (EPROM), a hard disk drive, and a removable medium). The auxiliary storage device stores various programs such as an operating system (OS) and application programs. Various functions (software modules) that meet a predetermined purpose can be implemented through execution of such programs. However, some or all of the functions of the in-vehicle terminal 100 may be implemented by a hardware circuit such as an application specific integrated circuit (ASIC) or a field programmable gate array (FPGA).

The control unit 101 is an arithmetic unit that implements the functions of the in-vehicle terminal 100 by executing a first program stored in the storage unit 102. The control unit 101 can be implemented by a hardware processor such as a central processing unit (CPU), for example. The control unit 101 may be configured to include a RAM, a ROM, a cache memory, etc.

The storage unit 102 stores various types of information. The storage unit 102 is constituted by a storage medium such as a RAM, a magnetic disk, a flash memory, etc. The storage unit 102 stores the first program to be executed by the control unit 101, data to be used by the first program, etc. The first program according to the present embodiment is an application program that implements a function related to the route guidance between the station of public transportation and the stadium.

The input-output device 103 is a device that receives an input operation performed by the driver of the vehicle 10 and that presents information to the driver. The input-output device 103 may be configured to include a touch panel display, including a liquid crystal display (LCD), an electroluminescence (EL) panel, etc., by way of example. The input-output device 103 may be configured to further include a microphone that is used to input audio, a speaker that outputs audio, etc., in addition to the touch panel display.

The position acquisition unit 104 is a device that acquires the present position of the vehicle 10. The position acquisition unit 104 may be configured to include a global positioning system (GPS) receiver, by way of example. In another example, the position acquisition unit 104 may be configured to include a wireless communication circuit that uses a Wi-Fi (registered trademark) position information service.

The communication interface 105 is a communication interface that is used to connect the in-vehicle terminal 100 to the network N1. The communication interface 105 may be configured to include a wireless communication interface for wireless communication, etc., by way of example. In the present embodiment, the in-vehicle terminal 100 performs data communication with the operation management terminal 30 and the operation management server 40 through the communication interface 105.

In the in-vehicle terminal 100 configured as described above, the following functions are achieved by the control unit 101 executing the first program in the storage unit 102. That is, in the in-vehicle terminal 100, in response to the communication interface 105 receiving the first route information transmitted from the operation management server 40, the control unit 101 makes settings to use the departure location, the destination, and the first route included in the first route information as information for providing route guidance. Subsequently, the control unit 101 provides route guidance according to the first route in response to the arrival of the scheduled distribution start time included in the first route information.

In the in-vehicle terminal 100, in addition, when the vehicle 10 is traveling from the departure location to the destination (when route guidance is provided according to the first route), the control unit 101 acquires the present position of the vehicle 10 through the position acquisition unit 104 in predetermined cycles (e.g., every several tens of milliseconds to several hundreds of milliseconds). Each time the present position of the vehicle 10 is acquired, the control unit 101 transmits position information to the operation management terminal 30 and the operation management server 40 through the communication interface 105. The position information according to the present embodiment includes information that indicates the present position of the vehicle 10 and the vehicle ID of the vehicle 10.

Figure 3:
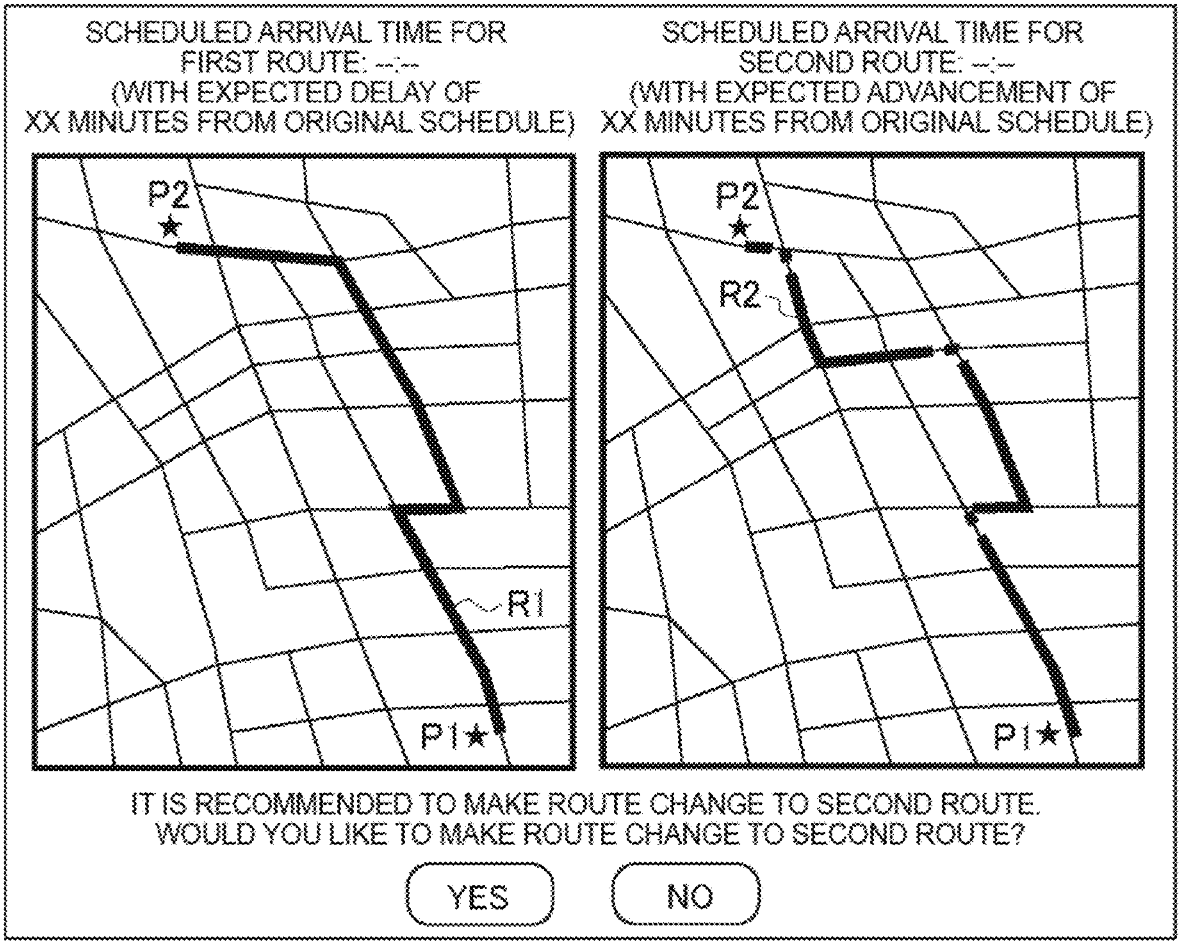
FIG. 3 illustrates an example of a display screen for route change suggestion information according to the embodiment.

In the in-vehicle terminal 100, further, in response to the communication interface 105 receiving the second route information transmitted from the operation management server 40, information (hereinafter occasionally referred to as "route change suggestion information") that prompts a route change from the first route to the second route is displayed on the touch panel display of the input-output device 103. FIG. 3 illustrates an example of a display screen for the route change suggestion information. In the example illustrated in FIG. 3, the display screen for the route change suggestion information includes text information that indicates the scheduled arrival time at the destination when the vehicle keeps traveling along the first route, text information that indicates the scheduled arrival time at the destination when a route change is made to the second route, map information that displays the first route, map information that displays the second route, text information that prompts a route change to the second route, graphical user interface (GUI) components ("YES" button and "NO" button in FIG. 3) that are used to select whether to make a route change to the second route, etc.

When an operation to select to make a route change to the second route (e.g., an operation to tap on the "YES" button in FIG. 3) is input to the touch panel display of the input-output device 103 with the display screen illustrated in FIG. 3 displayed on the touch panel display of the input-output device 103, the control unit 101 of the in-vehicle terminal 100 finishes providing route guidance according to the first route, and starts providing route guidance according to the second route. When an operation to select not to make a route change to the second route (e.g., an operation to tap on the "NO" button in FIG. 3) is input to the touch panel display of the input-output device 103 with the display screen illustrated in FIG. 3 displayed on the touch panel display of the input-output device 103, meanwhile, the control unit 101 of the in-vehicle terminal 100 continues providing route guidance according to the first route.

In response to the communication interface 105 receiving the second route information transmitted from the operation management server 40, the control unit 101 of the in-vehicle terminal 100 may automatically finish providing route guidance according to the first route, and automatically start providing route guidance according to the second route. That is, the process of displaying the route change suggestion information on the touch panel display of the input-output device 103 described above may be omitted.

In the specific hardware configuration of the in-vehicle terminal 100, a constituent element may be omitted, replaced, or added, as appropriate, according to the embodiment.

Viewing Terminal

Figure 4:
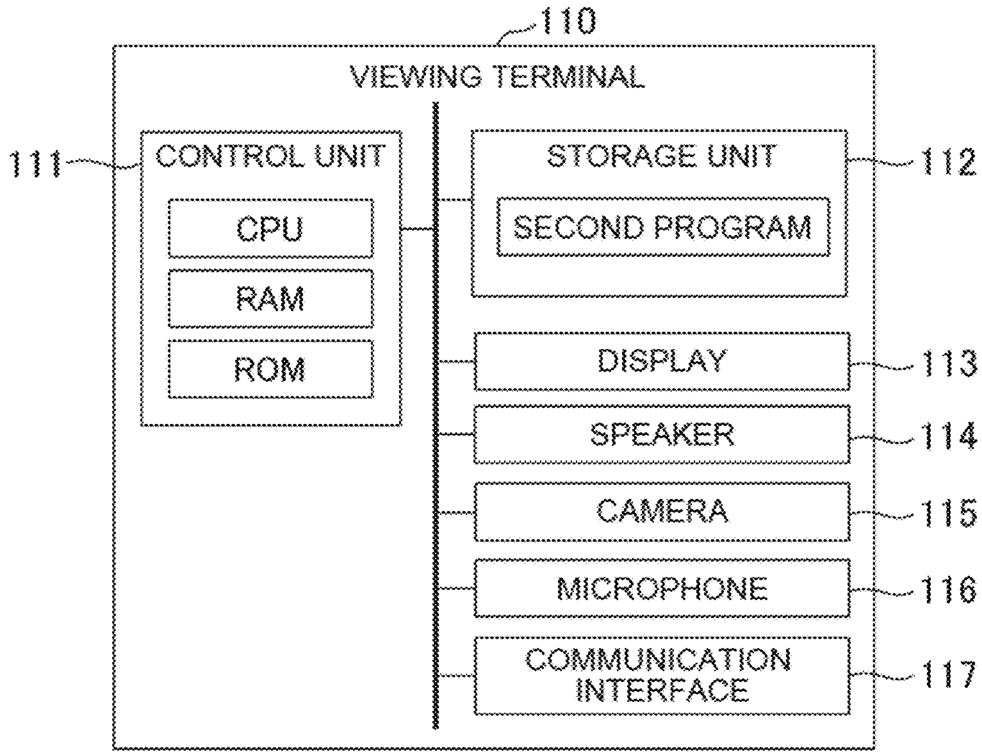
FIG. 4 schematically illustrates an example of the hardware configuration of a viewing terminal included in the system according to the embodiment.

FIG. 4 schematically illustrates an example of the hardware configuration of the viewing terminal 110 according to the present embodiment. The viewing terminal 110 is a computer provided in the vehicle 10, and includes a control unit 111, a storage unit 112, a display 113, a speaker 114, a camera 115, a microphone 116, and a communication interface 117.

The viewing terminal 110 can be constituted as a computer that includes a processor (such as a CPU or a DSP), a main storage device (such as a RAM and a ROM), an auxiliary storage device (such as an EPROM, a hard disk drive, and a removable medium), and an input-output device for images and audio. The auxiliary storage device stores various programs such as an OS and application programs. Various functions (software modules) that meet a predetermined purpose can be implemented through execution of such programs. However, some or all of the functions of the viewing terminal 110 may be implemented by a hardware circuit such as an ASIC or an FPGA.

The control unit 111 is an arithmetic unit that implements the functions of the viewing terminal 110 by executing a second program stored in the storage unit 112. The control unit 111 can be implemented by a hardware processor such as a CPU, as with the control unit 101 of the in-vehicle terminal 100. The control unit 111 may be configured to include a RAM, a ROM, a cache memory, etc.

The storage unit 112 stores various types of information. The storage unit 112 is constituted by a storage medium such as a RAM, a magnetic disk, a flash memory, etc., as with the storage unit 102 of the in-vehicle terminal 100. The storage unit 112 of the viewing terminal 110 stores the second program to be executed by the control unit 111, data to be used by the second program, etc. The second program according to the present embodiment is an application program that implements a function to play back the content distributed from the distribution terminal 20 for the passengers of the vehicle 10 and a function to transmit audio and/or an image of the passengers to the distribution terminal 20. The second program may be an application program for using a cloud-based web conferencing system, by way of example.

The display 113 is installed in the passenger cabin of the vehicle 10, and outputs an image (a video and a still image) contained in the content transmitted from the distribution terminal 20. The speaker 114 outputs audio contained in the content transmitted from the distribution terminal 20. The camera 115 is installed in the passenger cabin of the vehicle 10, and captures an image of the passenger cabin (the passengers in the passenger cabin). The microphone 116 is installed in the passenger cabin of the vehicle 10, and receives input of (picks up) audio from the passenger cabin (the passengers in the passenger cabin). The communication interface 117 is a communication interface that is used to connect the viewing terminal 110 to the network N1. The communication interface 117 may be configured to include a wireless communication interface for wireless communication, etc., as with the communication interface 105 of the in-vehicle terminal 100, by way of example. In the present embodiment, the viewing terminal 110 performs data communication with the distribution terminal 20 through the communication interface 117.

In the viewing terminal 110 configured as described above, the following functions are achieved by the control unit 111 executing the second program in the storage unit 112. That is, in the viewing terminal 110, in response to the communication interface 117 receiving the content distributed from the distribution terminal 20, the control unit 111 displays image data contained in the content on the display 113, and outputs audio data contained in the content to the speaker 114. In the viewing terminal 110, in addition, the image of the passenger cabin captured by the camera 115 and the audio from the passenger cabin picked up by the microphone 116 are transmitted to the distribution terminal 20 through the communication interface 117.

In the specific hardware configuration of the viewing terminal 110, a constituent element may be omitted, replaced, or added, as appropriate, according to the embodiment.

Distribution Terminal

Figure 5:
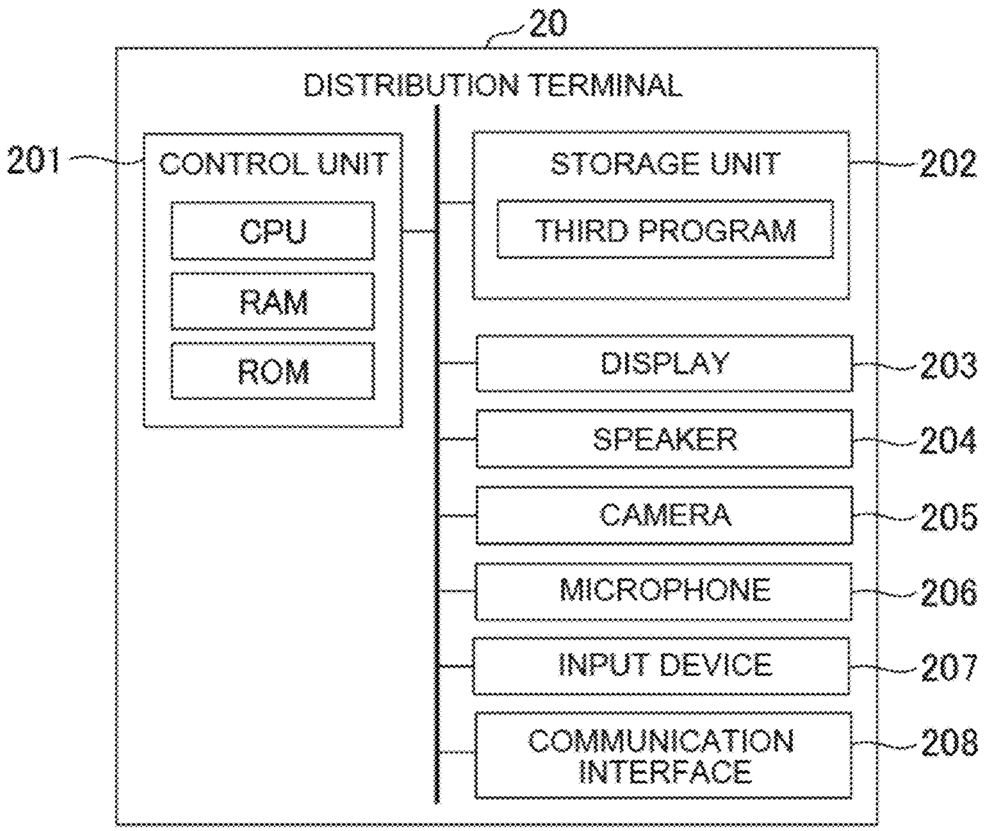
FIG. 5 schematically illustrates an example of the hardware configuration of a distribution terminal included in the system according to the embodiment.

FIG. 5 schematically illustrates an example of the hardware configuration of the distribution terminal 20 according to the present embodiment. The distribution terminal 20 is a computer that is used by the distributor of the content, and includes a control unit 201, a storage unit 202, a display 203, a speaker 204, a camera 205, a microphone 206, an input device 207, and a communication interface 208. The distribution terminal 20 may be configured to include a plurality of computers such as a computer that is used by the MC and a computer that is used by the player.

The distribution terminal 20 can be constituted as a computer that includes a processor (such as a CPU or a DSP), a main storage device (such as a RAM and a ROM), an auxiliary storage device (such as an EPROM, a hard disk drive, and a removable medium), and an input-output device for images and audio, as with the viewing terminal 110. The auxiliary storage device stores various programs such as an OS and application programs. Various functions (software modules) that meet a predetermined purpose can be implemented through execution of such programs. However, some or all of the functions of the distribution terminal 20 may be implemented by a hardware circuit such as an ASIC or an FPGA.

The control unit 201 is an arithmetic unit that implements the functions of the distribution terminal 20 by executing a third program stored in the storage unit 202. The control unit 201 can be implemented by a hardware processor such as a CPU, as with the control unit 101 of the in-vehicle terminal 100. The control unit 201 may be configured to include a RAM, a ROM, a cache memory, etc.

The storage unit 202 stores various types of information. The storage unit 202 is constituted by a storage medium such as a RAM, a magnetic disk, a flash memory, etc., as with the storage unit 102 of the in-vehicle terminal 100. The storage unit 202 of the distribution terminal 20 stores the third program to be executed by the control unit 201, data to be used by the third program, etc. The third program according to the present embodiment is an application program that implements a function to transmit the content distributed by the distributor to the viewing terminal 110 and a function to play back images and audio transmitted from the viewing terminal 110 for the distributor. The third program may be an application program for using a cloud-based web conferencing system, as with the second program, by way of example.

The display 203 outputs an image transmitted from the viewing terminal 110 (an image captured by the camera 115 of the viewing terminal 110). The speaker 204 outputs audio transmitted from the viewing terminal 110 (audio picked up by the microphone 116 of the viewing terminal 110). The camera 205 captures an image of the distributor (the MC, the player, etc.). The microphone 206 receives input of (picks up) audio of the distributor. The input device 207 receives an input operation performed by the distributor. The input device 207 may be configured to include a keyboard, a mouse, etc., by way of example. The communication interface 208 is a communication interface that is used to connect the distribution terminal 20 to the network N1. The communication interface 208 may be configured to include a network interface board, a wireless communication interface for wireless communication, etc., by way of example. In the present embodiment, the distribution terminal 20 performs data communication with the viewing terminal 110 and the operation management terminal 30 through the communication interface 208.

In the distribution terminal 20 configured as described above, the following functions are achieved by the control unit 201 executing the third program in the storage unit 202. That is, in the distribution terminal 20, in response to receiving input of the vehicle ID of the vehicle 10 as the destination of distribution of the content, the departure location (the station of public transportation or the stadium) of the vehicle 10 as the destination of distribution of the content, the destination (the stadium or the station of public transportation) of the vehicle 10 as the destination of distribution of the content, the scheduled distribution start time of the content, and the scheduled distribution end time of the content through the input device 207, the control unit 201 transmits distribution information to the operation management terminal 30 through the communication interface 208. The distribution information is information that includes the vehicle ID, the departure location, the destination, the scheduled distribution start time, the scheduled distribution end time, etc., input through the input device 207.

In the distribution terminal 20, in response to the arrival of the scheduled distribution start time of the content, the control unit 201 starts the distribution of the content to the viewing terminal 110 through the communication interface 208. In that event, the control unit 201 of the distribution terminal 20 may distribute a content generated in advance, such as a video that introduces the sports event to be held in the stadium and a highlight video of the sports event held in the stadium, to the viewing terminal 110. Alternatively, the control unit 201 of the distribution terminal 20 may be connected to the viewing terminal 110 using a web conferencing system so that a content containing an image captured by the camera 205 and audio picked up by the microphone 206 are distributed (live) in real time to the viewing terminal 110, and an image captured by the camera 115 of the viewing terminal 110 and audio picked up by the microphone 116 of the viewing terminal 110 are output in real time to the display 203 and the speaker 204 of the distribution terminal 20. Examples of the content to be distributed live include a video of an interview with a player, a video of a player that answers to a question from a passenger of the vehicle 10, etc. When the scheduled distribution end time of the content described above arrives, the control unit 201 of the distribution terminal 20 terminates the distribution of the content to the viewing terminal 110.

In the specific hardware configuration of the distribution terminal 20, a constituent element may be omitted, replaced, or added, as appropriate, according to the embodiment.

Operation Management Terminal

Figure 6:
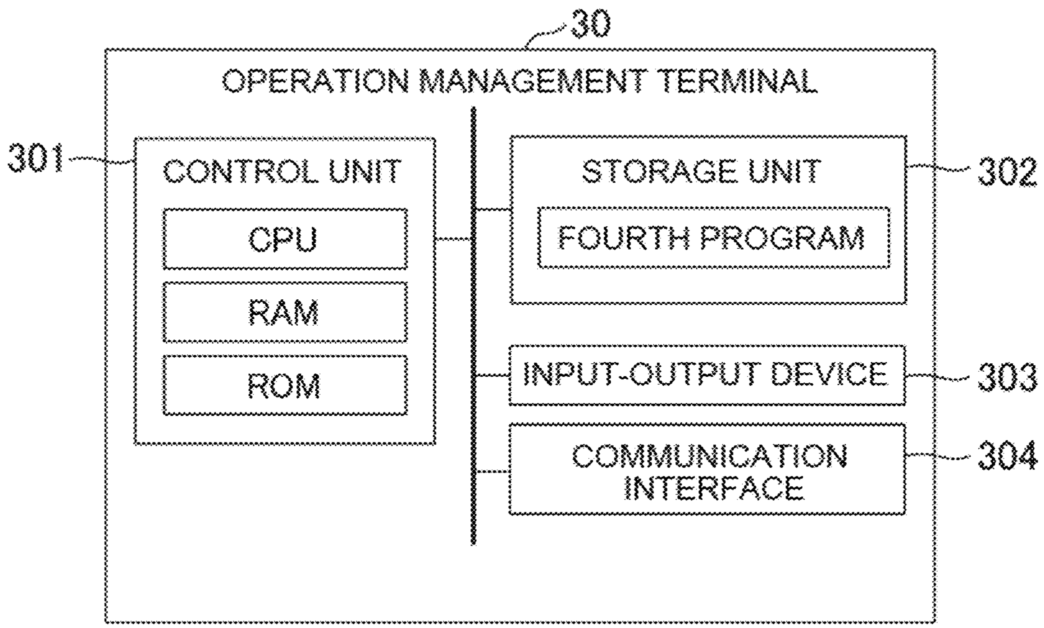
FIG. 6 schematically illustrates an example of the hardware configuration of an operation management terminal included in the system according to the embodiment.

FIG. 6 schematically illustrates an example of the hardware configuration of the operation management terminal 30 according to the present embodiment. The operation management terminal 30 is a computer that is used by the operation manager for the vehicle 10, and includes a control unit 301, a storage unit 302, an input-output device 303, and a communication interface 304. Such an operation management terminal 30 may be implemented by a personal computer (PC), a smartphone, or a tablet terminal.

The operation management terminal 30 can be constituted as a computer that includes a processor (such as a CPU or a DSP), a main storage device (such as a RAM and a ROM), and an auxiliary storage device (such as an EPROM, a hard disk drive, and a removable medium), as with the in-vehicle terminal 100. The auxiliary storage device stores various programs such as an OS and application programs. Various functions (software modules) that meet a predetermined purpose can be implemented through execution of such programs. However, some or all of the functions of the operation management terminal 30 may be implemented by a hardware circuit such as an ASIC or an FPGA.

The control unit 301 is an arithmetic unit that implements the functions of the operation management terminal 30 by executing a fourth program stored in the storage unit 302. The control unit 301 can be implemented by a hardware processor such as a CPU, as with the control unit 101 of the in-vehicle terminal 100. The control unit 301 may be configured to include a RAM, a ROM, a cache memory, etc.

The storage unit 302 stores various types of information. The storage unit 302 is constituted by a storage medium such as a RAM, a magnetic disk, a flash memory, etc., as with the storage unit 102 of the in-vehicle terminal 100. The storage unit 302 stores the fourth program to be executed by the control unit 301, data to be used by the fourth program, etc. The fourth program according to the present embodiment is an application program that implements a function related to the operation management for the vehicle 10.

The input-output device 303 is a device that receives an input operation performed by the operation manager and that presents information to the operation manager. The input-output device 303 may be configured to include a touch panel display, including an LCD, an EL panel, etc., by way of example. The input-output device 303 may be configured to further include a microphone that is used to input audio, a speaker that outputs audio, etc., in addition to the touch panel display.

The communication interface 304 is a communication interface that is used to connect the operation management terminal 30 to the network N1. The communication interface 304 may be configured to include a network interface board, a wireless communication interface for wireless communication, etc., by way of example. In the present embodiment, the operation management terminal 30 performs data communication with the distribution terminal 20 and the operation management server 40 through the communication interface 304.

In the operation management terminal 30 configured as described above, the following functions are achieved by the control unit 301 executing the fourth program in the storage unit 302. That is, in the operation management terminal 30, in response to the communication interface 304 receiving the distribution information transmitted from the distribution terminal 20, the control unit 301 transmits the received distribution information to the operation management server 40 through the communication interface 304. The control unit 301 may display the distribution information received from the distribution terminal 20 on the touch panel display of the input-output device 303, in addition to transmitting the distribution information received from the distribution terminal 20 to the operation management server 40. This allows the operation manager to grasp the distribution information.

In the operation management terminal 30, in addition, in response to the communication interface 304 receiving the first route information transmitted from the operation management server 40, the control unit 301 displays a map screen on which the first route is displayed on the touch panel display of the input-output device 303. In that event, the map screen may include the position of the predetermined location, the scheduled passage time for the predetermined location, etc. In the operation management terminal 30, further, the present position of the vehicle 10 is displayed on the map screen described above each time the position information transmitted from the in-vehicle terminal 100 is received.

In the operation management terminal 30, in addition, in response to the communication interface 304 receiving the route change information transmitted from the in-vehicle terminal 100, the control unit 301 displays a map screen on which the second route and the present position of the vehicle 10 are displayed on the touch panel display of the input-output device 303. In that event, the map screen may include the passage time for the predetermined location, the scheduled passage time for the predetermined location, the time difference between the passage time and the scheduled passage time for the predetermined location, the scheduled arrival time at the destination when the vehicle travels along the second route, etc.

In the specific hardware configuration of the operation management terminal 30, a constituent element may be omitted, replaced, or added, as appropriate, according to the embodiment.

Operation Management Server

Figure 7:
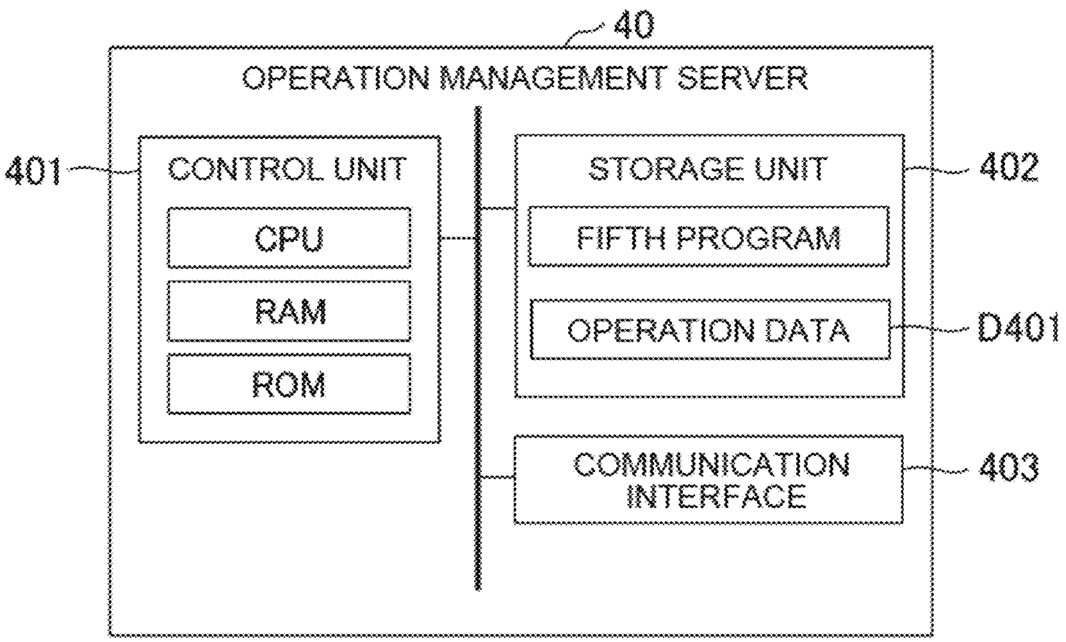
FIG. 7 schematically illustrates an example of the hardware configuration of an operation management server included in the system according to the embodiment.

FIG. 7 schematically illustrates an example of the hardware configuration of the operation management server 40 according to the present embodiment. The operation management server 40 according to the present embodiment is a computer that executes information processing related to the operation of the vehicle 10, and corresponds to the information processing device according to the present disclosure. The operation management server 40 according to the present embodiment is configured to include a control unit 401, a storage unit 402, and a communication interface 403. Such an operation management server 40 may be implemented by a single computer, or may be implemented by a combination of a plurality of computers.

The operation management server 40 can be constituted as a computer that includes a processor (such as a CPU or a DSP), a main storage device (such as a RAM and a ROM), and an auxiliary storage device (such as an EPROM, a hard disk drive, and a removable medium). The auxiliary storage device stores various programs such as an OS and application programs. Various functions (software modules) that meet a predetermined purpose can be implemented through execution of such programs. However, some or all of the functions of the operation management server 40 may be implemented by a hardware circuit such as an ASIC or an FPGA.

The control unit 401 is an arithmetic unit that implements the functions of the operation management server 40 by executing a fifth program stored in the storage unit 402. The control unit 401 can be implemented by a hardware processor such as a CPU, as with the control unit 101 of the in-vehicle terminal 100. The control unit 401 may be configured to include a RAM, a ROM, a cache memory, etc.

The storage unit 402 stores various types of information. The storage unit 402 is constituted by a storage medium such as a RAM, a magnetic disk, a flash memory, etc. The storage unit 402 stores the fifth program to be executed by the control unit 401, data (e.g., operation data D401 to be discussed later) to be used by the fifth program, etc. The fifth program according to the present embodiment is an application program that implements a function to determine travel routes (first route and second route) for the vehicle 10.

The operation data D401 stored in the storage unit 402 are information about the operation of one or more vehicles 10 under the management of the operation management server 40. Here, an example of the operation data D401 stored in the storage unit 402 will be described with reference to FIG. 8. FIG. 8 schematically illustrates an example of the operation data D401 according to the present embodiment. The operation data D401 include one or more records (hereinafter occasionally referred to as "vehicle-specific records") respectively corresponding to one or more vehicles 10 under the management of the operation management server 40. The vehicle-specific records have various fields for the vehicle ID, the departure location, the destination, the scheduled distribution start time, the scheduled distribution end time, the first route, the predetermined location, the scheduled passage time, the time shortening route, the time extension route, etc. Such vehicle-specific records are generated in response to the communication interface 403 receiving the distribution information transmitted from the operation management terminal 30. The vehicle-specific records are deleted in response to the relevant vehicle 10 arriving at the destination.

In the vehicle ID field, information (vehicle ID) for identifying each of the one or more vehicles 10 under the management of the operation management server 40 is registered. The information registered in the vehicle ID field may be identification information on the in-vehicle terminal 100 corresponding to each vehicle 10.

In the departure location field, information that indicates the departure location of each vehicle 10 is registered. Here, for the vehicle 10 that transports passengers from the station of public transportation to the stadium, information that indicates the station of public transportation is registered in the departure location field. For the vehicle 10 that transports passengers from the stadium to the station of public transportation, meanwhile, information that indicates the stadium is registered in the departure location field.

In the destination field, information that indicates the destination of each vehicle 10 is registered. Here, for the vehicle 10 that transports passengers from the station of public transportation to the stadium, information that indicates the stadium is registered in the destination field. For the vehicle 10 that transports passengers from the stadium to the station of public transportation, meanwhile, information that indicates the station of public transportation is registered in the destination field.

In the scheduled distribution start time field, information that indicates the scheduled distribution start time of the content for the viewing terminal 110 of each vehicle 10 is registered. In the scheduled distribution end time field, information that indicates the scheduled distribution end time of the content for the viewing terminal 110 of each vehicle 10 is registered.

In the first route field, information that indicates the first route for each vehicle 10 is registered. The information registered in the first route field may be a combination of road links and/or nodes included in the first route, by way of example. The registration of information in the first route field is performed when the first route for each vehicle 10 is determined.

In the predetermined location field, information that indicates a predetermined location set midway of the first route for each vehicle 10 is registered. The information registered in the predetermined location field may be information that indicates the position of the predetermined location. The registration of information in the predetermined location field is performed when the first route for each vehicle 10 is determined.

In the scheduled passage time field, information that indicates the scheduled passage time for the predetermined location set midway of the first route for each vehicle 10 is registered. The registration of information in the scheduled passage time field is performed when the first route for each vehicle 10 is determined.

In the time shortening route field, information that indicates the time shortening route for each vehicle 10 is registered. The information registered in the time shortening route field may include information that indicates the position or node of the branch location for the time shortening route located midway of the first route and a combination of road links and/or nodes included in the time shortening route, by way of example. The registration of information in the time shortening route field is performed when the first route for each vehicle 10 is determined.

In the time extension route field, information that indicates the time extension route for each vehicle 10 is registered. The information registered in the time extension route field may include information that indicates the position or node of the branch location for the time extension route located midway of the first route and a combination of road links and/or nodes included in the time extension route, by way of example. The registration of information in the time extension route field is performed when the first route for each vehicle 10 is determined.

Here, returning to the description of FIG. 7, the communication interface 403 is a communication interface that is used to connect the operation management server 40 to the network N1. The communication interface 403 may be configured to include a network interface board, a wireless communication interface for wireless communication, etc., by way of example. In the present embodiment, the operation management server 40 performs data communication with the in-vehicle terminal 100 and the operation management terminal 30 through the communication interface 403.

In the operation management server 40 configured as described above, the function to determine the first route, the function to determine the necessity of a route change, the function to determine the second route, etc., are achieved by the control unit 401 executing the fifth program in the storage unit 402. These functions will be discussed in detail later.

In the specific hardware configuration of the operation management server 40, a constituent element may be omitted, replaced, or added, as appropriate, according to the embodiment.

Software Configuration of Operation Management Server

Figure 9:
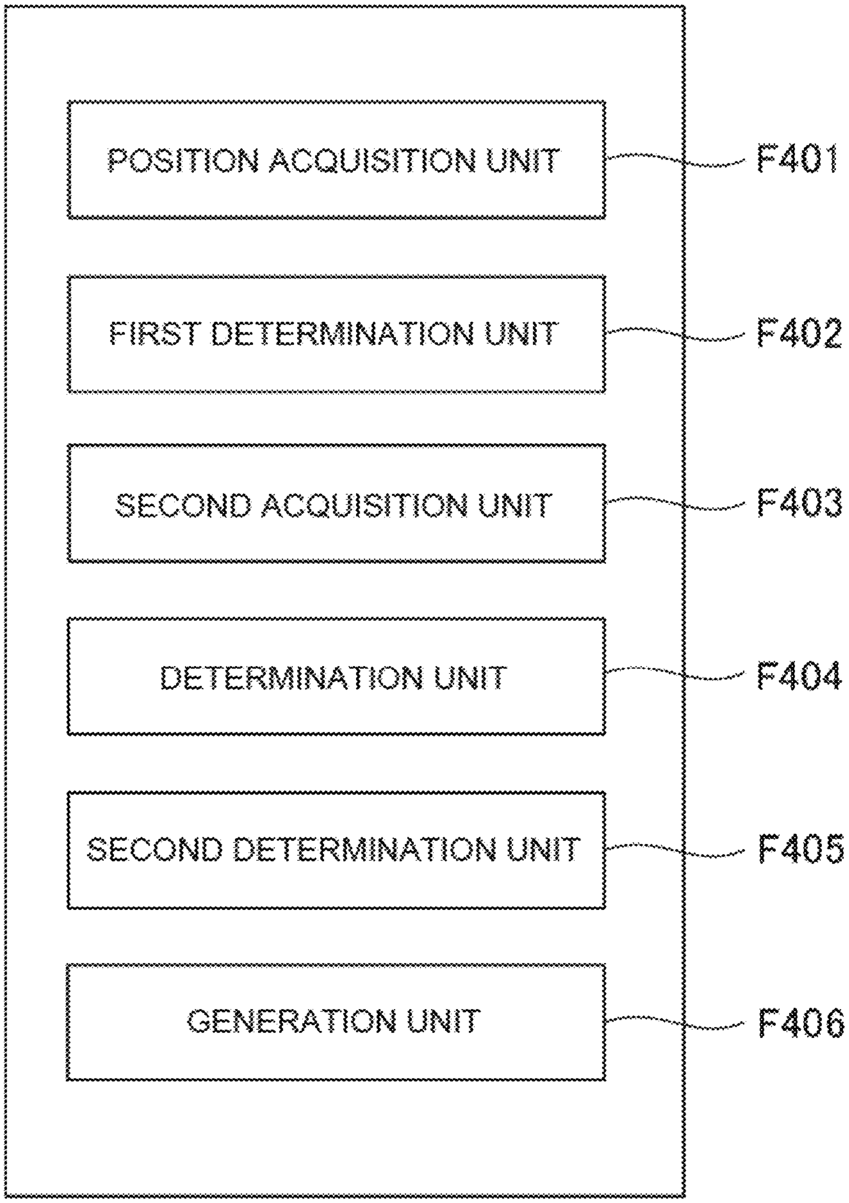
FIG. 9 is a block diagram illustrating an example of the software configuration of the operation management server according to the embodiment.

Next, the software configuration of the operation management server 40 according to the present embodiment will be described with reference to FIG. 9. FIG. 9 is a block diagram schematically illustrating an example of the software configuration of the operation management server 40 according to the present embodiment. The operation management server 40 according to the present embodiment operates as a computer that includes a first acquisition unit F401, a first determination unit F402, a second acquisition unit F403, a determination unit F404, a second determination unit F405, and a generation unit F406 as software modules, by the control unit 401 executing the fifth program in the storage unit 402.

Some or all of the first acquisition unit F401, the first determination unit F402, the second acquisition unit F403, the determination unit F404, the second determination unit F405, and the generation unit F406 may be implemented by a hardware circuit such as an ASIC or an FPGA.

The first acquisition unit F401 is configured to store received distribution information as the operation data D401 in the storage unit 402 in response to the communication interface 403 receiving the distribution information transmitted from the operation management terminal 30. Specifically, the first acquisition unit F401 adds a new vehicle-specific record to the operation data D401 in the storage unit 402. In that event, the vehicle ID, the departure location, the destination, the scheduled distribution start time, and the scheduled distribution end time included in the received distribution information are registered in the vehicle ID field, the departure location field, the destination field, the scheduled distribution start time field, and the scheduled distribution end time field, respectively, of the new vehicle-specific record. The first route field, the predetermined location field, the scheduled passage time field, the time shortening route field, and the time extension route field of the new vehicle-specific record are left blank.

The first determination unit F402 is configured to determine a first route in response to the addition of a new vehicle-specific record to the operation data D401 in the storage unit 402 by the first acquisition unit F401. The first route according to the present embodiment is a route that is expected to allow the vehicle 10, starting at the departure location at the scheduled distribution start time, to arrive at the destination within a predetermined period (e.g., within 10 minutes before and after the scheduled distribution end time) including the scheduled distribution end time, and that enables a route change to a time shortening route and a time extension route to be made midway of the route. The time shortening route is a route expected to advance the time of arrival at the destination when the vehicle 10 makes a route change to the time shortening route midway of the first route, compared to when the vehicle 10 keeps traveling on the first route. The time extension route is a route expected to delay the time of arrival at the destination when the vehicle 10 makes a route change to the time extension route midway of the first route, compared to when the vehicle 10 keeps traveling on the first route.

In determining a first route that meets the condition described above, the first determination unit F402 first extracts a plurality of route candidates for a route that is travelable by the vehicle 10 from the departure location to the destination and that is expected to allow the vehicle 10, starting at the departure location at the scheduled distribution start time, to arrive at the destination within a predetermined period. By way of example, a required time for each of all the routes that are travelable by the vehicle 10 from the departure location to the destination may be stored in advance in the storage unit 402, and a plurality of routes having a required time within a predetermined range (e.g., a range of 10 minutes plus or minus the time length from the scheduled distribution start time to the scheduled distribution end time of the content) may be extracted as route candidates. The required time for each of all the routes that are travelable by the vehicle 10 from the departure location to the destination may be stored in the storage unit 402 according to the day of the week and/or according to the time zone. In that case, the first determination unit F402 may extract, as route candidates, one or more routes having a required time corresponding to the day of the week and/or the time zone in which the relevant vehicle 10 is scheduled to travel within the predetermined range. The required time for each of all the routes that are travelable by the vehicle 10 from the departure location to the destination may be an average value of the time taken by a plurality of probe vehicles to actually travel the route in the past, by way of example. In another example, the required time for each of all the routes that are travelable by the vehicle 10 from the departure location to the destination may be estimated (computed) based on the length of the route, the legal speed limit of the route, the number of traffic signals installed along the route, the amount of traffic on the route, etc.

Figure 10:
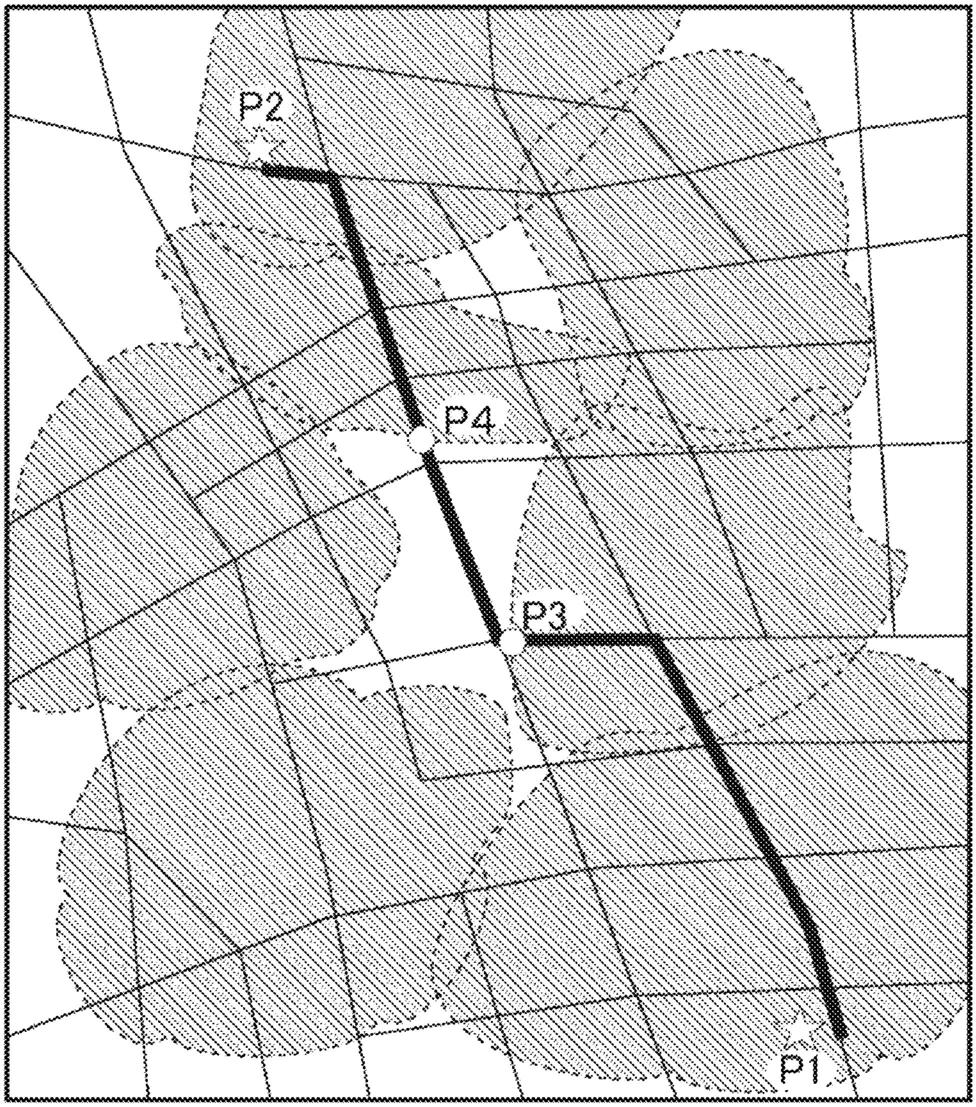
FIG. 10 illustrates an example of a route candidate that passes through an excluded area according to the embodiment.

Next, the first determination unit F402 excludes route candidates that pass through an area (hereinafter occasionally referred to as "excluded area") in which the communication quality is less than a predetermined quality from the extracted route candidates. FIG. 10 illustrates an example of a route candidate that passes through an excluded area. Areas (hatched areas) surrounded by thin broken lines in FIG. 10 are areas in which the communication quality is equal to or higher than the predetermined quality. In other words, non-hatched areas in FIG. 10 correspond to excluded areas. In FIG. 10, a location P1 indicates the departure location, and a location P2 indicates the destination. In the example illustrated in FIG. 10, the route candidate (route indicated by the thick solid line in FIG. 10) passes through the excluded area in a section from a location P3 to a location P4 in the middle of the route candidate. Therefore, such a route candidate is excluded from the candidates for the first route.

Map information (hereinafter occasionally referred to as a "quality map") for an area including the departure location and the destination of the vehicle 10 in which areas in which the communication quality is equal to or higher than the predetermined quality and the excluded areas are differentiated may be stored in advance in the storage unit 402. In that case, the first determination unit F402 may determine whether each of the extracted route candidates passes through an excluded area using the quality map.

The predetermined quality of the communication quality may be set such that at least one of reference signal received power RSRP, reference signal received quality RSRQ, and signal-to-interference-plus-noise ratio SINR is equal to or more than a value required for the distribution of the content, for example. Alternatively, the predetermined quality of the communication quality may be set such that the time for which at least one of uplink and downlink data transfer speeds continues to be less than a predetermined speed is less than a threshold value.

When route candidates that pass through the excluded area are excluded from the extracted route candidates, the first determination unit F402 determines a first route from among the remaining route candidates (route candidates that do not pass through the excluded area). Specifically, the first determination unit F402 determines, as the first route, a route candidate that enables a route change to a time shortening route to be made midway of the route candidate and that enables a route change to a time extension route to be made midway of the route candidate, among the route candidates that do not pass through the excluded area. In that event, route candidates that do not enable a route change to a time shortening route that does not pass through the excluded area and route candidates that do not enable a route change to a time extension route that does not pass through the excluded area are excluded from candidates for the first route.

Figure 11:
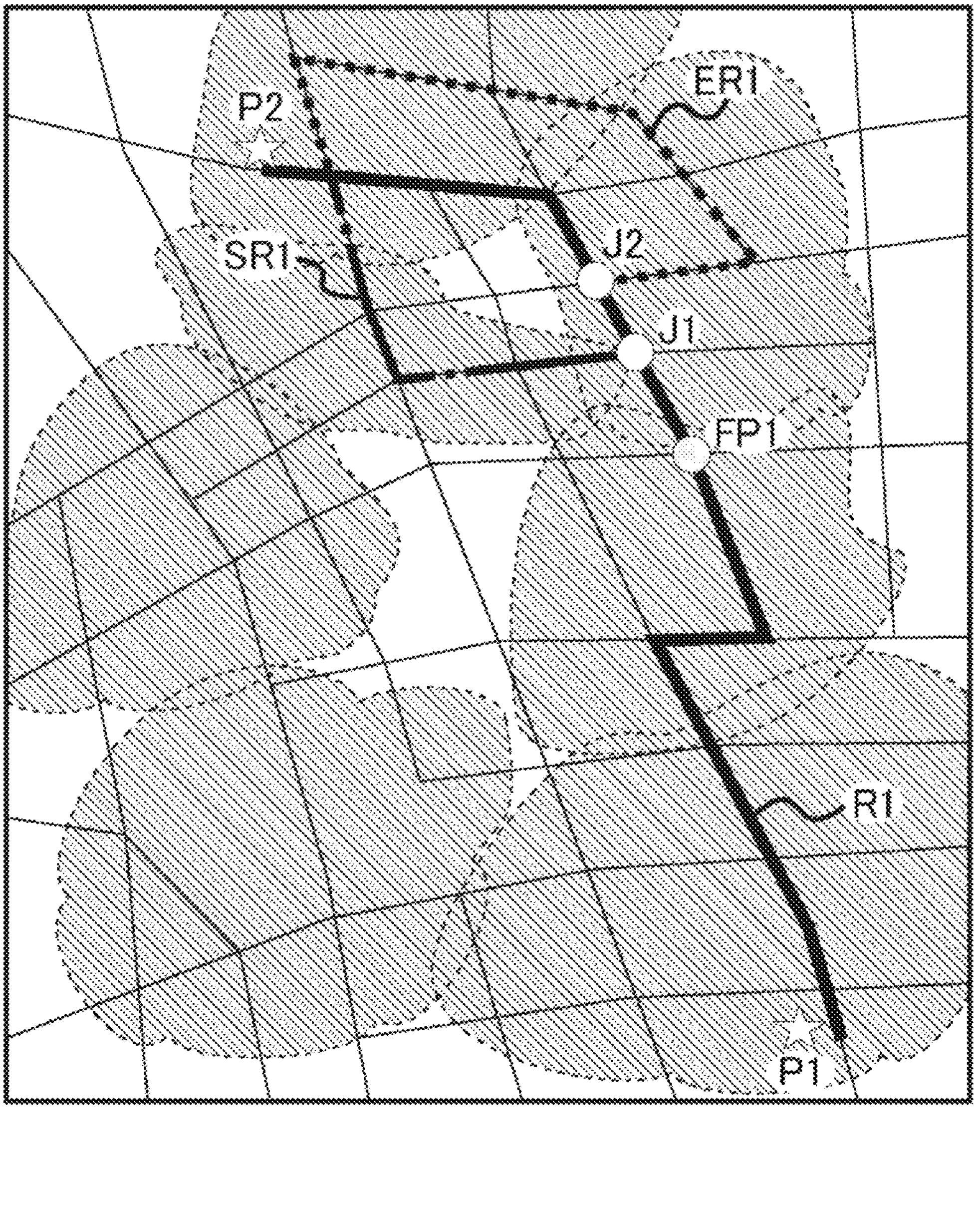
FIG. 11 illustrates an example of a first route according to the embodiment.

FIG. 11 illustrates an example of the first route. The location P1, the location P2, a location J1, a location J2, a route R1 (thick solid line), a route SR1 (thick long-dashed short-dashed line), and a route ER1 (thick broken line) in FIG. 11 indicate the departure location, the destination, the branch location for the time shortening route, the branch location for the time extension route, the first route, the time shortening route, and the time extension route, respectively.

As illustrated in FIG. 11, the first route R1, the time shortening route SR1, and the time extension route ER1 are each determined so as not to pass through the excluded area. The time shortening route SR1 is determined as a route with a short length compared to a section of the first route R1 from the branch location J1 to the destination P2. The time shortening route SR1 may be determined as a route with a small number of traffic signals installed, with a high legal speed limit, or with a small amount of traffic compared to the section of the first route R1 from the branch location J1 to the destination P2. The time extension route ER1 is determined as a route with a long length compared to a section of the first route R1 from the branch location J2 to the destination P2. The time extension route ER1 may be determined as a route with a large number of traffic signals installed, with a low legal speed limit, or with a large amount of traffic compared to the section of the first route R1 from the branch location J2 to the destination P2. The time shortening route and the time extension route corresponding to the first route are not limited to a single combination of such routes as illustrated in FIG. 11, and there may be a plurality of combinations of such routes.

The first determination unit F402 determines a predetermined location in response to the determination of the first route. The predetermined location is a location on the closer side with respect to (closer to the departure location than) the branch location for the time shortening route and the branch location for the time extension route, among locations included in the first route. Here, in the example illustrated in FIG. 11, the first determination unit F402 sets, as the predetermined location, a location FP1 on the closer side with respect to the branch location J1 for the time shortening route SR1 and the branch location J2 for the time extension route ER1, among locations included in the first route R1. In that event, the predetermined location FP1 may be set such that the distance between one of the branch location J1 and the branch location J2 on the closer side (the branch location J1 in the example illustrated in FIG. 11) and the predetermined location FP1 is equal to or more than a predetermined distance, by way of example. The predetermined distance may be such a distance that the time required for the vehicle 10 to travel through the predetermined distance is longer than the time required to make a route change to a second route to be discussed later. For the first route R1 for which a plurality of combinations of the time shortening route and the time extension route is set, a plurality of predetermined locations FP1 may be set.

The first determination unit F402 determines a scheduled passage time for the predetermined location in response to the determination of the predetermined location. The scheduled passage time is such a time that the vehicle 10 is expected to arrive at the destination within the predetermined period if the time difference between the time (passage time) at which the vehicle 10 actually passes the predetermined location and the scheduled passage time is equal to or less than a predetermined time length (e.g., about several minutes). Such a scheduled passage time may be determined based on the distance from the predetermined location to the destination, the number of traffic signals installed in a section from the predetermined location to the destination, the amount of traffic in the section from the predetermined location to the destination, etc., by way of example. In another example, the scheduled passage time may be determined based on an average value of the time taken by a plurality of probe vehicles to travel from the predetermined location to the destination in the past. That is, the scheduled passage time may be a time obtained by subtracting the average value from the scheduled distribution end time of the content.

When the content to be distributed includes a content to be distributed live such as a video of an interview with a player or a video of a player that answers to a question from a passenger of the vehicle 10, the scheduled distribution end time of the content may be changed in the middle of the vehicle 10 traveling in a section from the departure location to the predetermined location (in the middle of the distribution of the content). In such a case, the first determination unit F402 may change the scheduled passage time for the predetermined location according to the scheduled distribution end time after the change. By way of example, when the scheduled distribution end time after the change is later than the scheduled distribution end time before the change, the first determination unit F402 may set a time obtained by adding the time difference between the scheduled distribution end times before and after the change to the scheduled passage time before the change as the scheduled passage time after the change. When the scheduled distribution end time after the change is earlier than the scheduled distribution end time before the change, the first determination unit F402 may set a time obtained by subtracting the time difference between the scheduled distribution end times before and after the change from the scheduled passage time before the change as the scheduled passage time after the change.

The first determination unit F402 registers information that indicates the first route, information that indicates the predetermined location, information that indicates the scheduled passage time, information that indicates the time shortening route, and information that indicates the time extension route in the new vehicle-specific record added to the operation data D401 by the first acquisition unit F401 in response to the determination of the scheduled passage time for the predetermined location. In that event, the information that indicates the first route is registered in the first route field of the new vehicle-specific record. The information that indicates the predetermined location is registered in the predetermined location field of the new vehicle-specific record. The information that indicates the scheduled passage time is registered in the scheduled passage time field of the new vehicle-specific record. The information that indicates the time shortening route is registered in the time shortening route field of the new vehicle-specific record. The information that indicates the time extension route is registered in the time extension route field of the new vehicle-specific record.

In addition, the first determination unit F402 transmits the first route information to the in-vehicle terminal 100 and the operation management terminal 30 in response to the determination of the scheduled passage time for the predetermined location. The first route information includes information includes information that indicates the departure location, the destination, the scheduled distribution start time, the scheduled distribution end time, and the first route.

Next, the second acquisition unit F403 is configured to acquire the time at which the vehicle 10 has actually passed the predetermined location. Specifically, each time the communication interface 403 receives position information transmitted from the in-vehicle terminal 100, the second acquisition unit F403 first acquires the present position included in the received position information. Subsequently, the second acquisition unit F403 accesses the operation data D401 in the storage unit 402 using the vehicle ID included in the received position information as an argument, and specifies a vehicle-specific record having information that coincides with the vehicle ID registered in the vehicle ID field. The second acquisition unit F403 extracts information registered in the predetermined location field of the specified vehicle-specific record. Then, the second acquisition unit F403 compares the present position of the vehicle 10 included in the position information and the predetermined location extracted from the vehicle-specific record. In that event, the second acquisition unit F403 determines that the vehicle 10 has not passed the predetermined location yet if the present position of the vehicle 10 is on the closer side with respect to (closer to the departure location than) the predetermined location. If the present position of the vehicle 10 coincides with the predetermined location, meanwhile, it is determined that the vehicle 10 has passed the predetermined location. When it is determined that the vehicle 10 has passed the predetermined location, the second acquisition unit F403 acquires a present time as the passage time for the predetermined location.

The determination unit F404 is configured to determine whether it is necessary for the vehicle 10 to make a route change in response to the second acquisition unit F403 acquiring the passage time for the predetermined location. Specifically, the determination unit F404 first accesses the operation data D401 in the storage unit 402, and extracts a scheduled passage time registered in the scheduled passage time field of the vehicle-specific record corresponding to the vehicle 10. Subsequently, the determination unit F404 computes a time difference between the passage time acquired by the second acquisition unit F403 and the scheduled passage time extracted from the operation data D401. The determination unit F404 determines whether the computed time difference is greater than a predetermined time length. When the computed time difference is greater than the predetermined time length, the determination unit F404 determines that it is necessary for the vehicle 10 to make a route change. In that event, if the passage time acquired by the second acquisition unit F403 is later than the scheduled passage time extracted from the operation data D401, the determination unit F404 determines that it is necessary to make a route change to the time shortening route midway of the first route. If the passage time acquired by the second acquisition unit F403 is earlier than the scheduled passage time extracted from the operation data D401, on the other hand, the determination unit F404 determines that it is necessary to make a route change to the time extension route midway of the first route. When the computed time difference is equal to or less than the predetermined time length, meanwhile, the determination unit F404 determines that it is not necessary for the vehicle 10 to make a route change.

The second determination unit F405 determines a second route in response to it being determined by the determination unit F404 that it is necessary for the vehicle 10 to make a route change. The second route is a route that leads to the destination by passing through the time shortening route from the middle of the first route, or a route that leads to the destination by passing through the time extension route from the middle of the first route.

Figure 12:
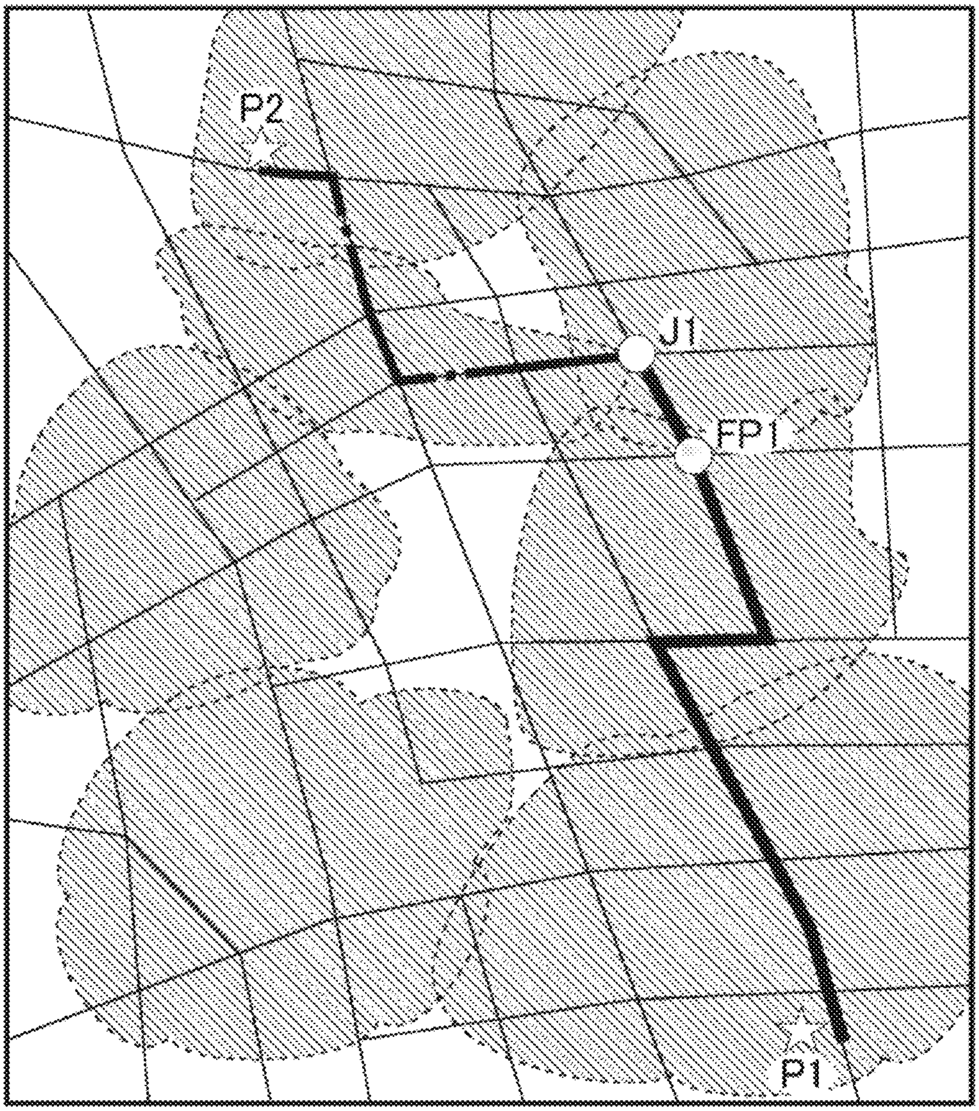
FIG. 12 illustrates an example of a second route according to the embodiment.

Here, if the actual passage time is later than the scheduled passage time for the predetermined location, the second determination unit F405 determines the route that leads to the destination by passing through the time shortening route from the middle of the first route as the second route. By way of example, as illustrated in FIG. 12, the second determination unit F405 determines, as the second route, a route that passes through the same route as the first route indicated in FIG. 11 and discussed earlier from the departure location P1 to the branch location J1 (thick solid line in FIG. 12) and that passes through the same route as the time shortening route indicated in FIG. 11 and discussed earlier from the branch location J1 to the destination P2 (thick long-dashed short-dashed line in FIG. 12).

Figure 13:
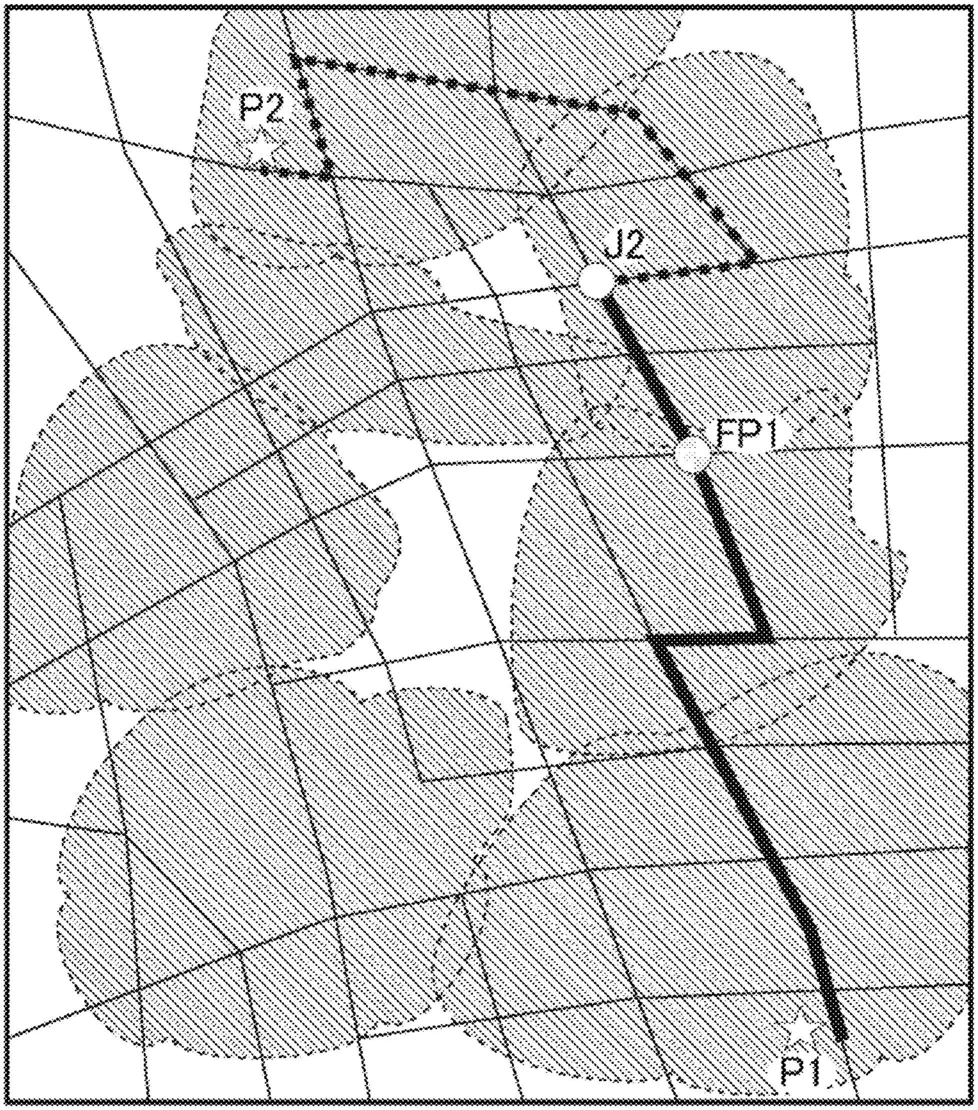
FIG. 13 illustrates another example of the second route according to the embodiment.

If the actual passage time is earlier than the scheduled passage time for the predetermined location, meanwhile, the second determination unit F405 determines a route that leads to the destination by passing through the time extension route from the middle of the first route as the second route. By way of example, as illustrated in FIG. 13, the second determination unit F405 determines, as the second route, a route that passes through the same route as the first route indicated in FIG. 11 and discussed earlier from the departure location P1 to the branch location J2 (thick solid line in FIG. 13) and that passes through the same route as the time extension route indicated in FIG. 11 and discussed earlier from the branch location J2 to the destination P2 (thick broken line in FIG. 13).

The generation unit F406 is configured to generate second route information in response to the determination of the second route by the second determination unit F405. The second route information is information that prompts a route change from the first route to the second route, and includes information that indicates the second route, the scheduled arrival time at the destination when the vehicle keeps traveling along the first route, the scheduled arrival time at the destination when a route change is made to the second route, etc. The information that indicates the second route may be a combination of road links and nodes included in the second route (e.g., a node that indicates the branch location J1 or the branch location J2 in FIG. 11). The scheduled arrival time at the destination when the vehicle keeps traveling along the first route may be computed according to the actual passage time for the predetermined location, the length of a section of the first route from the predetermined location to the destination, the number of traffic signals set in the section of the first route from the predetermined location to the destination, the amount of traffic in the section of the first route from the predetermined location to the destination, etc., by way of example. The scheduled arrival time at the destination when a route change is made to the second route may be computed according to the actual passage time for the predetermined location, the length of a section of the second route from the predetermined location to the destination, the number of traffic signals installed in the section of the second route from the predetermined location to the destination, the amount of traffic in the section of the second route from the predetermined location to the destination, etc., by way of example. The second route information generated by the generation unit F406 is transmitted to the in-vehicle terminal 100 and the operation management terminal 30 through the communication interface 403.

Process Flow

Figure 14:
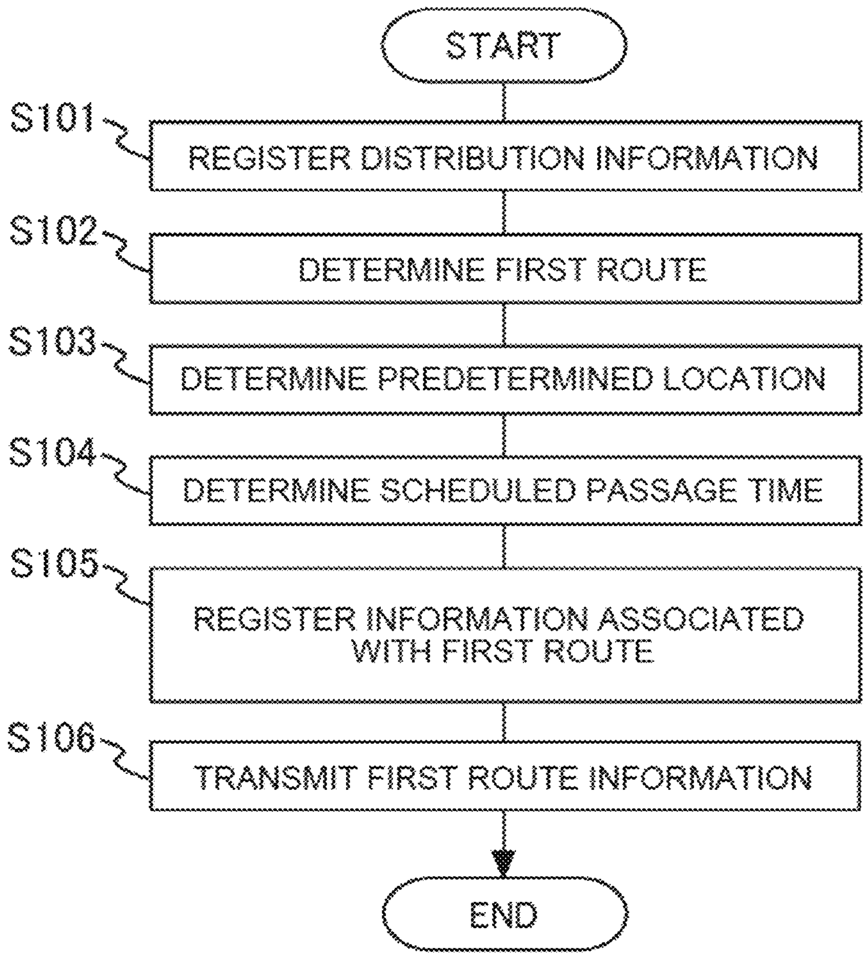
FIG. 14 is a flowchart illustrating an example of a first processing routine executed by the operation management server according to the embodiment.
Figure 15:
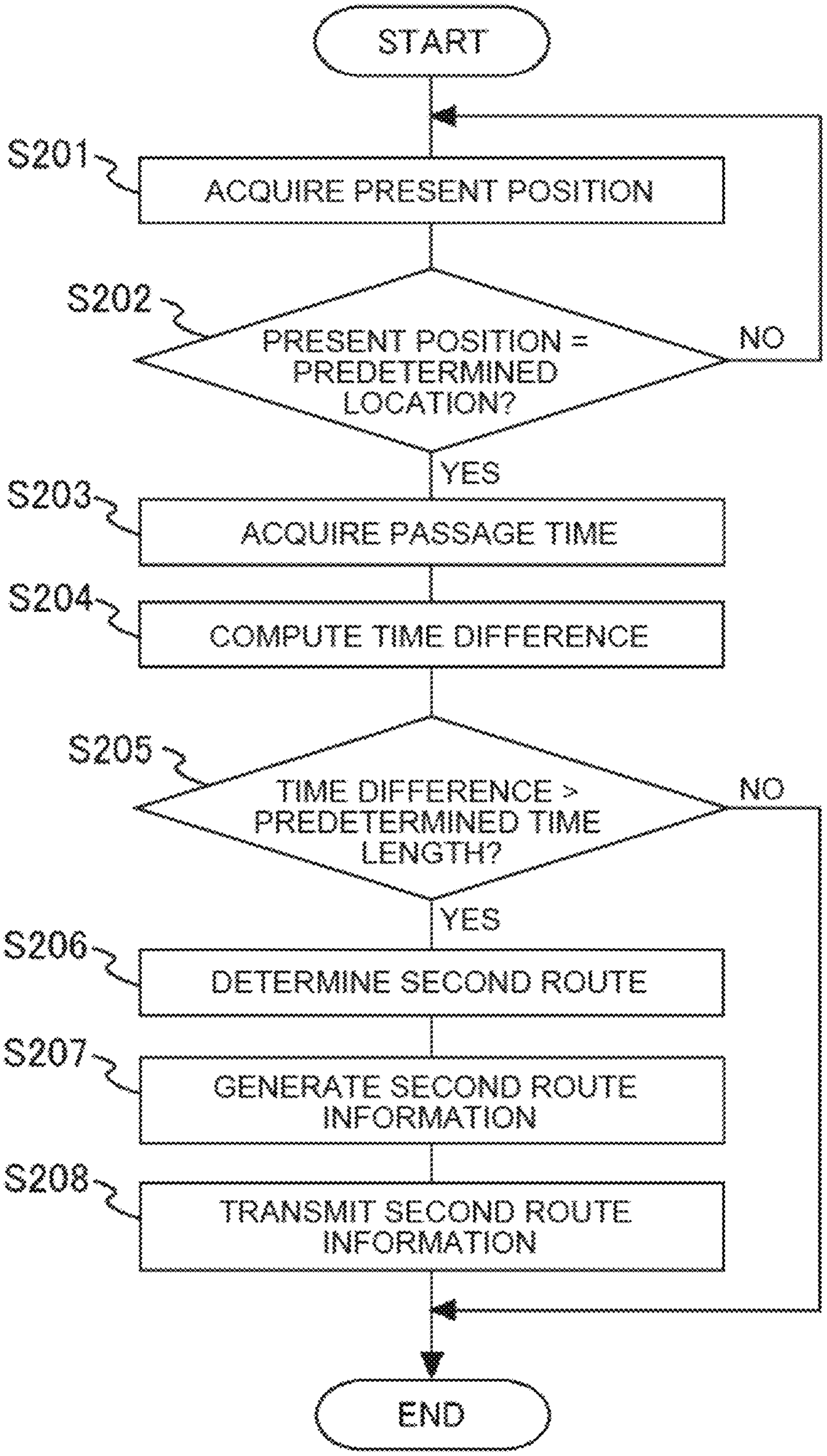
FIG. 15 is a flowchart illustrating an example of a second processing routine executed by the operation management server according to the embodiment.

Here, the flow of a process executed by the operation management server 40 according to the present embodiment will be described with reference to FIGS. 14 and 15. FIG. 14 is a flowchart illustrating an example of a first process routine executed by the operation management server 40 when triggered by the reception of the distribution information transmitted from the operation management terminal 30. FIG. 15 is a flowchart illustrating an example of a second process routine executed by the operation management server 40 when triggered by the arrival of the scheduled distribution start time of the content. While the subject of execution of the first process routine in FIG. 14 and the second process routine in FIG. 15 is the control unit 401 of the operation management server 40, it is assumed that the subject of execution is the software modules of the operation management server 40 in the description here.

First, in the first process routine in FIG. 14, in response to the communication interface 403 receiving distribution information transmitted from the operation management terminal 30, the control unit 401 operates as the first acquisition unit F401 by executing the fifth program in the storage unit 402. The first acquisition unit F401 registers the received distribution information in the operation data D401 in the storage unit 402 (step S101). Specifically, the first acquisition unit F401 first adds a new vehicle-specific record to the operation data D401 in the storage unit 402. Subsequently, the first acquisition unit F401 registers the vehicle ID, the departure location, the destination, the scheduled distribution start time, and the scheduled distribution end time included in the distribution information in the vehicle ID field, the departure location field, the destination field, the scheduled distribution start time field, and the scheduled distribution end time field, respectively, of the new vehicle-specific record. When the first acquisition unit F401 finishes the execution of the process in step S101, the control unit 401 operates as the first determination unit F402 to execute the process in step S102.

In step S102, the first determination unit F402 determines a first route according to the distribution information registered in the operation data D401 by the first acquisition unit F401. Specifically, the first determination unit F402 first extracts a plurality of route candidates for a route that is travelable by the vehicle 10 from the departure location to the destination registered in the operation data D401 and that is expected to allow the vehicle 10, starting at the departure location at the scheduled distribution start time registered in the operation data D401, to arrive at the destination within a predetermined period. Then, the first determination unit F402 specifies route candidates that do not pass through the excluded area, among the extracted route candidates. Then, the first determination unit F402 determines, as the first route, a route candidate that enables a route change to a time shortening route that does not pass through the excluded area to be made midway of the route candidate and that enables a route change to a time extension route that does not pass through the excluded area to be made midway of the route candidate, among the route candidates that do not pass through the excluded area, as described with reference to FIG. 11. When the determination of the first route is finished, the first determination unit F402 executes the process in step S103.

In step S103, the first determination unit F402 determines a predetermined location corresponding to the first route determined in step S102. The predetermined location is a location on the closer side with respect to (closer to the departure location than) the branch location for the time shortening route and the branch location for the time extension route, among locations included in the first route. Such a predetermined location is set such that the distance between one of the branch location for the time shortening route and the branch location for the time extension route that is closer to the departure location and the predetermined location is equal to or more than a predetermined distance, as described with reference to FIG. 11. When determining of the predetermined location on the first route is finished, the first determination unit F402 executes the process in step S104.

In step S104, the first determination unit F402 determines a scheduled passage time for the predetermined location determined in step S103. The scheduled passage time is such a time that the vehicle 10 is expected to arrive at the destination within the predetermined period if the time difference between the time (passage time) at which the vehicle 10 actually passes the predetermined location and the scheduled passage time is equal to or less than a predetermined time length. Such a scheduled passage time may be determined based on the distance from the predetermined location to the destination, the number of traffic signals installed in a section from the predetermined location to the destination, the amount of traffic in the section from the predetermined location to the destination, etc., by way of example. In another example, the scheduled passage time may be determined based on an average value of the time taken by a plurality of probe vehicles to travel from the predetermined location to the destination in the past. When the determination of the scheduled passage time for the predetermined location is finished, the first determination unit F402 executes the process in step S105.

In step S105, the first determination unit F402 registers information associated with the first route in the operation data D401 in the storage unit 402. The information associated with the first route includes information that indicates the first route determined in step S102, information that indicates the predetermined location determined in step S103, information that indicates the scheduled passage time determined in step S104, information that indicates the time shortening route corresponding to the first route determined in step S102, and information that indicates the time extension route corresponding to the first route determined in step S102. These pieces of information are registered in the vehicle-specific record added to the operation data D401 by the first acquisition unit F401 in step S101. Specifically, the information that indicates the first route is registered in the first route field of the vehicle-specific record. The information that indicates the predetermined location is registered in the predetermined location field of the vehicle-specific record. The information that indicates the scheduled passage time is registered in the scheduled passage time field of the vehicle-specific record. The information that indicates the time shortening route is registered in the time shortening route field of the vehicle-specific record. The information that indicates the time extension route is registered in the time extension route field of the vehicle-specific record. When the registration of the information associated with the first route in the operation data D401 in the storage unit 402 is finished, the first determination unit F402 executes the process in step S106.

In step S106, the first determination unit F402 transmits the first route information to the in-vehicle terminal 100 and the operation management terminal 30 through the communication interface 403. The first route information includes information that indicates the departure location, the destination, the scheduled distribution start time, the scheduled distribution end time, and the first route, as discussed earlier. When the first determination unit F402 finishes the transmission of the first route information, the execution of the first process routine is ended.

In the in-vehicle terminal 100, upon receiving the first route information transmitted from the operation management server 40, the control unit 101 makes settings to use the departure location, the destination, and the first route included in the first route information as information for providing route guidance. In the operation management terminal 30, upon receiving the first route information transmitted from the operation management server 40, meanwhile, the control unit 301 displays a map screen on which the first route, the predetermined location, and the scheduled passage time for the predetermined location are displayed on the touch panel display of the input-output device 303.

When the scheduled distribution start time of the content arrives after the execution of the first process routine described above is terminated, the in-vehicle terminal 100 starts providing route guidance according to the first route, and starts a process of transmitting position information to the operation management terminal 30 and the operation management server 40 in predetermined cycles. When the position information transmitted from the in-vehicle terminal 100 is received by the communication interface 403 of the operation management server 40 in response to the in-vehicle terminal 100 starting the process of transmitting position information to the operation management terminal 30 and the operation management server 40 in predetermined cycles, the control unit 401 of the operation management server 40 executes the second process routine in FIG. 15.

In the second process routine in FIG. 15, in response to the communication interface 403 receiving position information transmitted from the in-vehicle terminal 100, the control unit 401 operates as the second acquisition unit F403 by executing the fifth program in the storage unit 402. The second acquisition unit F403 acquires a present position of the vehicle 10 (step S201) by extracting the present position included in the received position information. When the acquisition of the present position of the vehicle is finished, the second acquisition unit F403 executes the process in step S202.

In step S202, the second acquisition unit F403 determines whether the present position acquired in step S201 coincides with the predetermined location. Specifically, the second acquisition unit F403 first accesses the operation data D401 in the storage unit 402 using the vehicle ID included in the received position information as an argument, and specifies a vehicle-specific record having information that coincides with the vehicle ID registered in the vehicle ID field. The second acquisition unit F403 extracts information (information that indicates the predetermined location) registered in the predetermined location field of the specified vehicle-specific record. Then, the second acquisition unit F403 determines whether the present position of the vehicle 10 and the predetermined location coincide with each other. In that event, if the present position of the vehicle 10 does not coincide with the predetermined location (a negative determination is made in step S202), the second acquisition unit F403 stands by until the next position information is transmitted from the in-vehicle terminal 100, and executes the processes in steps S201 and S202 again. If the present position of the vehicle 10 coincides with the predetermined location (a positive determination is made in step S202), on the other hand, the second acquisition unit F403 determines that the vehicle 10 has actually passed the predetermined location. In that case, the second acquisition unit F403 executes the process in step S203.

In step S203, the second acquisition unit F403 acquires a present time as the time (passage time) at which the vehicle 10 has actually passed the predetermined location. When the acquisition of the passage time by the second acquisition unit F403 is finished, the control unit 401 operates as the determination unit F404 to execute the process in step S204.

In step S204, the determination unit F404 computes a time difference between the passage time for the predetermined location and the scheduled passage time. More particularly, the determination unit F404 first extracts information (scheduled passage time for the predetermined location) registered in the scheduled passage time field of the vehicle-specific record specified in step S202. Subsequently, the determination unit F404 computes a time difference between the passage time for the predetermined location and the scheduled passage time. When the computation of the time difference between the passage time for the predetermined location and the scheduled passage time is finished, the determination unit F404 executes the process in step S205.

In step S205, the determination unit F404 determines whether the time difference computed in step S204 is greater than a predetermined time length. In that event, if the time difference computed in step S204 is not greater than the predetermined time length (a negative determination is made in step S205), the determination unit F404 determines that it is not necessary to change the route for the vehicle 10. In that case, the execution of the second process routine is ended. If the time difference computed in step S204 is greater than the predetermined time length (a positive determination is made in step S205), on the other hand, the determination unit F404 determines that it is necessary to change the route for the vehicle 10. More particularly, if the passage time for the predetermined location is later than the scheduled passage time, the determination unit F404 determines that it is necessary to make a route change to the time shortening route midway of the first route. If the passage time for the predetermined location is earlier than the scheduled passage time, meanwhile, the determination unit F404 determines that it is necessary to make a route change to the time extension route midway of the first route. When it is determined that it is necessary to change the route for the vehicle 10, the control unit 401 operates as the second determination unit F405 to execute the process in step S206.

In step S206, the second determination unit F405 determines a second route. In that event, if the passage time for the predetermined location is later than the scheduled passage time, the second determination unit F405 determines a route that leads to the destination by passing through the time shortening route from the middle of the first route as the second route, as described with reference to FIG. 12. If the passage time for the predetermined location is earlier than the scheduled passage time, on the other hand, the second determination unit F405 determines a route that leads to the destination by passing through the time extension route from the middle of the first route as the second route, as described with reference to FIG. 13. When the second determination unit F405 finishes the determination of the second route, the control unit 401 operates as the generation unit F406 to execute the process in step S207.

In step S207, the generation unit F406 generates second route information corresponding to the second route determined in step S206. The second route information is information that prompts a route change from the first route to the second route, and includes information that indicates the second route, the scheduled arrival time at the destination when the vehicle keeps traveling along the first route, the scheduled arrival time at the destination when a route change is made to the second route, etc. The scheduled arrival time at the destination when the vehicle keeps traveling along the first route may be computed according to the passage time for the predetermined location, the length of a section of the first route from the predetermined location to the destination, the number of traffic signals set in the section of the first route from the predetermined location to the destination, the amount of traffic in the section of the first route from the predetermined location to the destination, etc., as discussed earlier. The scheduled arrival time at the destination when a route change is made to the second route may be computed according to the passage time for the predetermined location, the length of a section of the second route from the predetermined location to the destination, the number of traffic signals installed in the section of the second route from the predetermined location to the destination, the amount of traffic in the section of the second route from the predetermined location to the destination, etc., as discussed earlier. When the generation of the second route information is finished, the generation unit F406 executes the process in step S208.

In step S208, the generation unit F406 transmits the second route information generated in step S207 to the in-vehicle terminal 100 and the operation management terminal 30 through the communication interface 403. When the generation unit F406 finishes the transmission of the second route information, the execution of the second process routine is ended.

Functions and Effects of Embodiment

In the embodiment discussed above, a route candidate for a route which does not pass through the excluded area and for which a route change can be made to a time shortening route that does not pass through the excluded area and a time extension route that does not pass through the excluded area midway of the route is determined as the first route, among a plurality of route candidates expected to allow the vehicle 10, starting at the departure location at the scheduled distribution start time of the content, to arrive at the destination within a predetermined period including the scheduled distribution end time of the content. By causing the vehicle 10 to travel along such a first route, it is possible to suppress a reduction in the quality of communication between the distribution terminal 20 and the viewing terminal 110 in the middle of the distribution of the content.

In the embodiment discussed above, in addition, a location on the closer side with respect to (closer to the destination than) the branch location for the time shortening route and the branch location for the time extension route, among locations included in the first route, is set as the predetermined location. Then, if the time difference between the passage time for the predetermined location (time at which the vehicle 10 has actually passed the predetermined location) and the scheduled passage time for the predetermined location is greater than the predetermined time length, information (route change suggestion information) that prompts a route change from the first route to the second route is suggested to the driver of the vehicle 10. In that event, if the passage time for the predetermined location is later than the scheduled passage time, a route that leads to the destination by passing through the time shortening route from the middle of the first route is suggested as the second route. If the passage time for the predetermined location is earlier than the scheduled passage time, on the other hand, a route that leads to the destination by passing through the time extension route from the middle of the first route is suggested as the second route. This allows the driver of the vehicle 10 to easily make a route change from the first route to the second route. As a result, the deviation between the time at which the vehicle 10 arrives at the destination and the distribution end time of the content can be reduced as much as possible, even when the amount of traffic on the first route is more or less than expected, etc.

In the embodiment discussed above, in addition, when the scheduled distribution end time of the content is changed while the vehicle 10 is traveling in a section from the departure location to the predetermined location, the scheduled passage time for the predetermined location is changed according to the scheduled distribution end time after the change. This makes it possible to more reliably suppress the deviation between the time at which the vehicle 10 arrives at the destination and the distribution end time of the content to be small, even if the scheduled distribution end time is changed, when the content to be distributed include a content to be distributed live such as a video of an interview with a player or a video of a player that answers to a question from a passenger of the vehicle 10.

Thus, according to the present embodiment, it is possible to increase the satisfaction of a passenger of the vehicle 10 with a service that distributes a content to the passenger.

Others

The embodiment described above is merely illustrative, and the present disclosure may be modified as appropriate to be implemented without departing from the spirit and scope of the present disclosure. For example, the in-vehicle terminal 100 may be configured to implement the function to determine the first route, the function to determine the predetermined location, the function to determine the scheduled passage time for the predetermined location, the function to determine the necessity of a route change midway of the first route, and the function to determine the second route, among the functions of the operation management server 40. In that case, the in-vehicle terminal 100 corresponds to the information processing device according to the present disclosure. Alternatively, the operation management terminal 30 may be configured to implement the function to determine the first route, the function to determine the predetermined location, the function to determine the scheduled passage time for the predetermined location, the function to determine the necessity of a route change midway of the first route, and the function to determine the second route, among the functions of the operation management server 40. In that case, the operation management terminal 30 corresponds to the information processing device according to the present disclosure.

The processes described as being performed by a single device may be executed in a distributed manner by a plurality of devices. The processes described as being performed by different devices may be executed by a single device. For example, a combination of at least two of the operation management server 40, the in-vehicle terminal 100, and the operation management terminal 30 may implement the function to determine the first route, the function to determine the predetermined location, the function to determine the scheduled passage time for the predetermined location, the function to determine the necessity of a route change midway of the first route, and the function to determine the second route, among the functions of the operation management server 40. The hardware components that implement functions in the computer system are flexibly changeable.

The present disclosure may also be implemented by supplying a computer with a computer program (information processing program) that implements the functions described in relation to the above embodiment and causing one or more processors of the computer to read and execute the computer program. Such a computer program may be provided to the computer by a non-transitory computer-readable storage medium that is connectable to the system bus of the computer, or may be provided to the computer via a network. The non-transitory computer-readable storage medium is a storage medium that can store information such as data and programs through electrical, magnetic, optical, mechanical, or chemical action and that can be read by a computer, etc. Such a storage medium can be exemplified by a disk of any type such as a magnetic disk (such as a floppy (registered trademark) disk or a hard disk drive (HDD)) or an optical disc (such as a compact disc (CD)-ROM, a digital versatile disc (DVD), or a Blu-ray disc), for example. The storage medium may also be a medium such as a ROM, a RAM, an EPROM, an electrically erasable programmable read only memory (EEPROM), a magnetic card, a flash memory, an optical card, and a solid state drive (SSD).

What is claimed is:

1. An information processing device that executes information processing about a route to be moved by a vehicle from a first location to a second location, comprising a control unit configured to:

acquire a scheduled available end time of a content for a passenger of the vehicle while the vehicle moves from the first location to the second location;

determine a first route expected to allow the vehicle to arrive at the second location within a predetermined period including the scheduled available end time;

acquire a passage time at which the vehicle has actually passed a third location located midway of the first route;

determine according to the passage time whether it is necessary to make a route change midway of the first route;

determine a second route expected to advance or delay a time of arrival at the second location compared to the first route in response to it being determined that it is necessary to make the route change midway of the first route; and output information that causes the route change to the second route midway of the first route.

2. An information processing device that executes information processing about a route to be traveled by a vehicle from a departure location to a destination, comprising a control unit configured to:

acquire a scheduled distribution end time of a content to be distributed to a passenger of the vehicle during travel;

determine a first route expected to allow the vehicle to arrive at the destination within a predetermined period including the scheduled distribution end time;

acquire a passage time at which the vehicle has actually passed a predetermined location located midway of the first route;

determine according to the passage time whether it is necessary to make a route change midway of the first route;

determine a second route expected to advance or delay a time of arrival at the destination compared to the first route in response to it being determined that it is necessary to make the route change midway of the first route; and output information that prompts the route change to the second route midway of the first route.

3. The information processing device according to claim 2, wherein the determining of the first route includes:

extracting a plurality of route candidates for a route that is travelable by the vehicle from the departure location to the destination and that is expected to allow the vehicle to arrive at the destination within the predetermined period; and determining, as the first route, a route candidate that enables a route change to a time shortening route to be made midway of the route candidate and that enables a route change to a time extension route to be made midway of the route candidate, among the route candidates, the time shortening route being expected to advance the time of arrival at the destination and the time extension route being expected to delay the time of arrival at the destination.

4. The information processing device according to claim 3, wherein the extracting of the route candidates includes excluding a route that passes through an area in which a communication quality is less than a predetermined quality from a plurality of routes, each of the routes being a route that is travelable by the vehicle from the departure location to the destination and that is expected to allow the vehicle to arrive at the destination within the predetermined period.

5. The information processing device according to claim 3, wherein in response to the determining of the first route, the control unit sets, as the predetermined location, a location located midway of the first route and on a closer side with respect to a branch location for the time shortening route and a branch location for the time extension route.

6. The information processing device according to claim 5, wherein the determining as to whether it is necessary to make the route change midway of the first route includes:

determining that it is necessary to make the route change midway of the first route when a time difference between a scheduled passage time for the predetermined location and the passage time is greater than a predetermined time length; and determining that it is not necessary to make the route change midway of the first route when the time difference between the scheduled passage time for the predetermined location and the passage time is not greater than the predetermined time length.

7. The information processing device according to claim 6, wherein the determining that it is necessary to make the route change midway of the first route includes:

determining that it is necessary to make a route change to the time shortening route midway of the first route when the passage time is later than the scheduled passage time for the predetermined location; and determining that it is necessary to make a route change to the time extension route midway of the first route when the passage time is earlier than the scheduled passage time for the predetermined location.

8. The information processing device according to claim 7, wherein the determining of the second route includes:

determining a route that leads to the destination by passing through the time shortening route from a middle of the first route as the second route when the passage time is later than the scheduled passage time for the predetermined location; and determining a route that leads to the destination by passing through the time extension route from a middle of the first route as the second route when the passage time is earlier than the scheduled passage time for the predetermined location.

9. The information processing device according to claim 6, wherein the control unit changes the scheduled passage time for the predetermined location when the scheduled distribution end time of the content has been changed.

10. An information processing method for a route to be traveled by a vehicle from a departure location to a destination, wherein a computer is configured to:

acquire a scheduled distribution end time of a content to be distributed to a passenger of the vehicle during travel;

determine a first route expected to allow the vehicle to arrive at the destination within a predetermined period including the scheduled distribution end time;

acquire a passage time at which the vehicle has actually passed a predetermined location located midway of the first route;

determine according to the passage time whether it is necessary to make a route change midway of the first route;

determine a second route expected to advance or delay a time of arrival at the destination compared to the first route in response to it being determined that it is necessary to make the route change midway of the first route; and output information that prompts the route change to the second route midway of the first route.

11. The information processing method according to claim 10, wherein the determining of the first route includes:

extracting a plurality of route candidates for a route that is travelable by the vehicle from the departure location to the destination and that is expected to allow the vehicle to arrive at the destination within the predetermined period; and determining, as the first route, a route candidate that enables a route change to a time shortening route to be made midway of the route candidate and that enables a route change to a time extension route to be made midway of the route candidate, among the route candidates, the time shortening route being expected to advance the time of arrival at the destination and the time extension route being expected to delay the time of arrival at the destination.

12. The information processing method according to claim 11, wherein the extracting of the route candidates includes excluding a route that passes through an area in which a communication quality is less than a predetermined quality from a plurality of routes that is travelable by the vehicle from the departure location to the destination and that is expected to allow the vehicle to arrive at the destination within the predetermined period.

13. The information processing method according to claim 11, wherein in response to the determining of the first route, the computer sets, as the predetermined location, a location located midway of the first route and on a closer side with respect to a branch location for the time shortening route and a branch location for the time extension route.

14. The information processing method according to claim 13, wherein the determining as to whether it is necessary to make the route change midway of the first route includes:

determining that it is necessary to make the route change midway of the first route when a time difference between a scheduled passage time for the predetermined location and the passage time is greater than a predetermined time length; and determining that it is not necessary to make the route change midway of the first route when the time difference between the scheduled passage time for the predetermined location and the passage time is not greater than the predetermined time length.

15. The information processing method according to claim 14, wherein the determining that it is necessary to make the route change midway of the first route includes:

determining that it is necessary to make a route change to the time shortening route midway of the first route when the passage time is later than the scheduled passage time for the predetermined location; and determining that it is necessary to make a route change to the time extension route midway of the first route when the passage time is earlier than the scheduled passage time for the predetermined location.

16. The information processing method according to claim 15, wherein the determining of the second route includes:

determining a route that leads to the destination by passing through the time shortening route from a middle of the first route as the second route when the passage time is later than the scheduled passage time for the predetermined location; and determining a route that leads to the destination by passing through the time extension route from a middle of the first route as the second route when the passage time is earlier than the scheduled passage time for the predetermined location.

17. The information processing method according to claim 14, wherein the computer changes the scheduled passage time for the predetermined location when the scheduled distribution end time of the content has been changed.

* * * * *